(12) United States Patent
Shadik et al.

(10) Patent No.: US 10,904,510 B2
(45) Date of Patent: *Jan. 26, 2021

(54) METHODS AND SYSTEMS FOR PRESERVING PRECISION IN COMPRESSED DEPTH DATA

(71) Applicant: Verizon Patent and Licensing Inc., Arlington, VA (US)

(72) Inventors: Joshua Shadik, Jersey City, NJ (US); Oliver S. Castaneda, Rochester, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/897,016

(22) Filed: Jun. 9, 2020

(65) Prior Publication Data

US 2020/0304772 A1 Sep. 24, 2020

Related U.S. Application Data

(63) Continuation of application No. 16/112,600, filed on Aug. 24, 2018, now Pat. No. 10,715,784.

(51) Int. Cl.
*H04N 13/161* (2018.01)
*H04N 13/111* (2018.01)
(Continued)

(52) U.S. Cl.
CPC ........... *H04N 13/161* (2018.05); *G06T 15/20* (2013.01); *H04N 13/111* (2018.05); *H04N 13/128* (2018.05); *H04N 13/139* (2018.05); *H04N 13/15* (2018.05); *H04N 13/194* (2018.05); *G06T 7/11* (2017.01); *G06T 2207/10016* (2013.01); *G06T 2207/10028* (2013.01); *G06T 2207/20128* (2013.01)

(58) Field of Classification Search
CPC .... H04N 13/161; H04N 13/128; H04N 13/15; H04N 13/139; H04N 13/194; H04N 13/111; G06T 15/20; G06T 7/11; G06T 2207/10016; G06T 2207/10028; G06T 2207/20128
USPC .................................................... 375/240.11
See application file for complete search history.

(56) References Cited

U.S. PATENT DOCUMENTS

| | | | |
|---|---|---|---|
| 2016/0034040 A1* | 2/2016 | Wada | G06F 3/011 348/47 |
| 2017/0280143 A1* | 9/2017 | Xu | H04N 19/91 |
| 2018/0108110 A1* | 4/2018 | Cuervo | G02B 27/017 |

* cited by examiner

*Primary Examiner* — Matthew K Kwan

(57) ABSTRACT

An exemplary data precision preservation system divides a depth representation into a first section and a second section separate from the first section. The system determines data bits representing numbers that correspond to a lowest non-null depth value and a highest non-null depth value represented in the first section, and converts an original set of depth values represented in the first section to a compressed set of depth values normalized based on the lowest and highest non-null depth values represented in the first section. The system then generates a dataset that includes data representative of the compressed set of depth values and an inverse view-projection transform that is based on the lowest and highest non-null depth values represented in the first section and is configured to facilitate conversion of the compressed set of depth values back to the original set of depth values. Corresponding systems and methods are also disclosed.

20 Claims, 17 Drawing Sheets

(51) Int. Cl.
*H04N 13/128* (2018.01)
*H04N 13/194* (2018.01)
*H04N 13/15* (2018.01)
*H04N 13/139* (2018.01)
*G06T 15/20* (2011.01)
*G06T 7/11* (2017.01)

| [Empty] 1004-1 | [Empty] 1004-2 | [Empty] 1004-4 | [Empty] 1004-5 |
|---|---|---|---|
| [Empty] 1004-6 | [Empty] 1004-11 | [Empty] 1004-15 | [Empty] 1004-16 |
| 1004-3 Clip: B1 | 1004-7 Clip: B2 | 1004-8 Clip: C1 | 1004-12 Clip: C2 |
| 1004-9 Clip: A1 | 1004-10 Clip: A2 | 1004-13 Clip: A3 | 1004-14 Clip: A4 |

|   |   |   |   |
|---|---|---|---|
| 1404-1 | 1404-2 | 1404-3 | 1404-4 |
| 1404-5 | 1404-6 | 1404-7 | 1404-8 |
| 1404-9 | 1404-10 | 1404-11 | 1404-12 |
| 1404-13 | 1404-14 | 1404-15 | 1404-16 |

|   |   |   |   |
|---|---|---|---|
| 1404-1 | 1404-2 | 1404-3 | 1404-4 |
| 1404-5 | 1404-6 | 1404-7 | 1404-8 |
| 1404-9 | 1404-10 | 1404-11 | 1404-12 |
| 1404-13 | 1404-14 | 1404-15 | 1404-16 |

METHODS AND SYSTEMS FOR PRESERVING PRECISION IN COMPRESSED DEPTH DATA

RELATED APPLICATIONS

This application is a continuation application of U.S. patent application Ser. No. 16/112,600, filed Aug. 24, 2018, and entitled "Methods and Systems for Preserving Precision in Compressed Depth Data Representative of a Scene," which is hereby incorporated by reference in its entirety.

BACKGROUND INFORMATION

Various immersive technologies (e.g., virtual reality technology, augmented reality technology, mixed reality technology, etc.) allow users of media player devices to experience immersive scenes that are different from a real-world environment within which the users and media player devices actually exist. For example, a virtual reality scene may be generated based on camera-captured scenery of a real-world scene or virtually-rendered scenery of a virtualized scene. Using an immersive technology such as virtual reality technology, users experience simulated scenes that may be difficult, expensive, or impossible to experience otherwise. Accordingly, virtual reality technology may provide users with a variety of entertainment, educational, vocational, and/or other enjoyable or valuable experiences that may otherwise be difficult or inconvenient for the users to obtain.

In some examples, virtual reality data is streamed from a virtual reality provider system to a user's media player device over a network. For instance, a virtual reality dataset representative of a virtual reality scene may be transmitted in real time as the user is experiencing the virtual reality scene by way of the media player device. Naturally, the user may desire that the virtual reality scene be received and presented at the highest standard of quality possible. However, generating and distributing virtual reality data consumes limited resources, and tradeoffs to quality are thus commonly made to attempt to preserve such resources. For example, by compressing data being transmitted over the network, a provider system may help ensure that data being streamed in real time does not fall behind what the media player device needs to provide the user with a smooth virtual reality experience (i.e., an experience free of lag, buffering interruptions, etc.). Unfortunately, conventional compression techniques typically compromise detail and quality of data, including, for example, the precision and/or accuracy of depth data used to reconstruct virtual reality scenes. As such, it is desirable to employ compression techniques that reduce resource usage while not impacting (or having a minimal impact on) the quality of the data.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 11 illustrates an altered depth representation comprising a plurality of sections that have been rearranged in order of density according to principles described herein.

FIGS. 14A and 14B illustrate an exemplary atlas frame according to principles described herein.

DETAILED DESCRIPTION OF PREFERRED EMBODIMENTS

Figure 1:
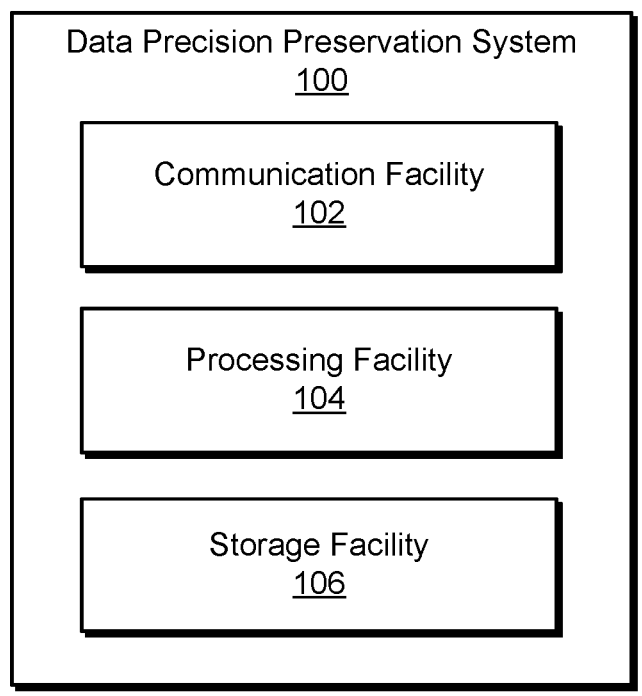
FIG. 1 illustrates an exemplary data precision preservation system for preserving precision in compressed depth data representative of a scene according to principles described herein.

Methods and systems for preserving precision in compressed depth data representative of a scene are described herein. More specifically, as will be described in more detail below, the methods and systems described herein may enable depth data precision and accuracy to be preserved (e.g., fully or partially preserved) even while the depth data is compressed to be represented using less information (e.g., fewer bits) per depth value in preparation for transmitting the depth data over a network to an end user device (referred to herein as a media player device). As will be described and illustrated below, this may be performed by separating a depth representation into different sections that have different depth ranges, processing the sections individually in accordance with methods described herein, and transmitting the processed sections with additional metadata to enable, at the media player device, each section to be correlated to a common world coordinate system.

In one implementation, for example, an exemplary data precision preservation system may access (e.g., receive, retrieve, load, generate, etc.) a depth representation of an immersive scene such as a virtual reality scene and divide the depth representation into a plurality of sections. The virtual reality scene may be associated with a world coordinate space, the depth representation may be associated with a screen coordinate space, and the plurality of sections may be associated with a plurality of different clip coordinate spaces. These and other coordinate spaces (all of which will be described in more detail below) may be used for different purposes, and transforms between the coordinate spaces may be determined to relate or correlate the coordinate spaces to one another (e.g., thereby allowing values to be readily transformed from one coordinate space to another).

The data precision preservation system may perform various operations with respect to each section in the plurality of sections into which the depth representation is divided. For example, referring to one particular section in the plurality of sections that is associated with a particular clip coordinate space included within the plurality of different clip coordinate spaces, the data precision preservation system may determine a lowest non-null depth value and a highest non-null depth value represented in the particular section of the depth representation. Based on the lowest and highest non-null depth values, the data precision preservation system may determine an inverse view-projection transform for transforming depth values from the particular clip coordinate space to the world coordinate space. The data precision preservation system may also convert an original set of depth values represented in the particular section of the depth representation to a compressed set of depth values normalized based on the lowest and highest non-null depth values represented in the particular section. For instance, the original set of depth values may be original depth values represented using a first number of data bits (e.g., 32 bits in one particular example) and the compressed set of depth values may be compressed depth values represented using a second number of data bits that is lower than the first number of bits (e.g., 16 bits in one particular example).

Once the compressed set of depth values is generated from the original set of depth values and the inverse view-projection transform is determined, the data precision preservation system may provide this data, along with any other data needed for reproducing a representation of the virtual reality scene, to a media player device by way of a network. Specifically, for example, the data precision preservation system may provide, to the media player device by way of the network, a virtual reality dataset representative of the virtual reality scene. The virtual reality dataset may include data representative of the compressed set of depth values, as well as the inverse view-projection transform. Using this data, the media player device may be able to represent the virtual reality scene using depth data that entirely or largely preserves details included in the original depth data despite having been compressed to reduce the amount of data transmitted over the network.

While the operation of the exemplary data precision preservation system described above focuses on a single section included within the divided depth representation, it will be understood that various benefits of the data precision preservation system (described in more detail below) are made possible by the fact that the data precision preservation system operates not only on one section of the depth representation, but on a plurality of sections or all the sections of the depth representation. For instance, in some examples, along with the particular section described above, the plurality of sections may further include an additional section associated with an additional clip coordinate space that is different from the particular clip coordinate space. As such, the data precision preservation system may further determine an additional lowest non-null depth value and an additional highest non-null depth value represented in the additional section of the depth representation, where the additional lowest and highest non-null depth values are different from the lowest and highest non-null depth values, respectively. The data precision preservation system may determine (e.g., based on the additional lowest and highest non-null depth values) an additional inverse view-projection transform (e.g., a transform different from the first inverse view-projection transform) for transforming depth values from the additional clip coordinate space to the world coordinate space. The data precision preservation system may also convert an additional original set of depth values represented in the additional section of the depth representation to an additional compressed set of depth values normalized based on the additional lowest and highest non-null depth values represented in the additional section. As with the original and compressed sets of depth values, the depth values in the additional compressed set of depth values may be represented using fewer data bits than the depth values in the additional original set of depth values.

In this example, when the data precision preservation system provides the virtual reality data to the mobile device, the virtual reality data may further include (i.e., along with the data representative of the first compressed set of depth values and the first inverse view-projection transform) data representative of the additional compressed set of depth values and the additional inverse view-projection transform that is different from the inverse view-projection transform. Additional methods and systems similar to these exemplary data precision preservation systems will be described and illustrated in more detail below.

Methods and systems described herein for preserving precision in compressed depth data representative of a scene may provide various advantages and benefits. For example, methods and systems described herein may significantly improve the accuracy, precision, and overall appearance of immersive content (e.g., virtual reality content, etc.) that is compressed, transmitted over a network, and rendered at an end-user device such as a media player device.

Conventional compression techniques have allowed depth datasets to be compressed and transmitted to devices, thereby providing various benefits (including benefits described above) relating to reducing usage of limited resources and improving performance in relation to various limitations associated with these resources (e.g., network bandwidth limitations, device communication limitations, device memory and processing limitations, etc.). However, as mentioned above, conventional compression techniques typically provide these benefits at the expense of the integrity and quality of the data being transmitted. For example, when depth data is compressed for transmission using conventional techniques, the resultant compressed data may necessarily compromise significant precision, accuracy, and/or detail inherent in the original (non-compressed) data.

In contrast, the methods and systems described herein involve data compression and, as such, provide the same or similar (e.g., superior) benefits described above relating to reducing resource usage and improving performance in light of resource limitations. However, rather than sacrificing data quality to do so, the methods and systems described herein advantageously provide these benefits while preserving and maintaining the quality (e.g., depth precision, depth accuracy, data integrity, etc.) of the original, non-compressed depth data, or at least reduce the overall negative affect that the compressing has on the data quality. As a result, the methods and systems disclosed herein act to reduce the cost of depth data compression significantly, enabling all the benefits of data compression with little or no quality tradeoff. This translates to a superior experience for end users (e.g., by allowing more realistic and detailed representations of virtual reality scenes to be presented to the user).

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary data precision preservation system 100 ("system 100") for preserving precision in compressed depth data representative of a scene. As shown, system 100 may include, without limitation, a communication facility 102, a processing facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. In some examples, each of facilities 102 through 106 may be distributed between multiple devices and/or multiple locations as may serve a particular implementation.

In some examples, facilities 102 through 106 may be configured to operate in real-time so as to access, process, and provide compressed depth data (e.g., within a virtual reality dataset) as fast as raw depth data is being generated (e.g., captured from a real-world scene, rendered from a virtualized scene, etc.). As used herein, operations may be performed in "real time" when they are performed immediately and without undue delay such that, for example, data processing operations associated with a virtual reality scene based on an ongoing event (e.g., a real-world sporting event, a virtualized gaming event, etc.) are performed while the event is still ongoing (i.e., rather than after the fact) even if there is some amount of delay such as a few seconds or minutes. In some examples, these types of real-time operations may allow virtual reality users to experience a real-world event live or at approximately the same time as people actually attending the event.

Each of facilities 102 through 106 may include or be implemented by one or more physical computing devices including hardware and/or software components such as processors, memories, storage drives, communication interfaces, instructions stored in memory for execution by the processors, and so forth. In some examples, the facilities may be implemented using separate computing components unique to each facility, while, in other examples, the facilities may be implemented using shared computing components. As will be described in more detail below, each of facilities 102 through 106 may be implemented on a server side of a server-client virtual reality data distribution architecture so as to provide virtual reality data to client devices (e.g., media player devices) located on a client side of the data distribution architecture. Each of facilities 102 through 106 will now be described in more detail.

Communication facility 102 may be configured to perform various operations associated with accessing and providing data that is to be, or already has been, processed by system 100 (e.g., by processing facility 104). For example, communication facility 102 may be configured to access a depth representation of a virtual reality scene (which may be processed by processing facility 104) and to provide a virtual reality dataset (which may include data processed by processing facility 104).

The sources and destinations of data transferred to and from system 100 by communication facility 102 may be any suitable systems or devices as may serve a particular implementation. For example, system 100 may be included within a virtual reality provider system and the depth representation of the virtual reality scene may be accessed from another component of the virtual reality provider system to which communication facility 102 is communicatively coupled. In other examples, system 100 itself (e.g., processing facility 104 or another facility not explicitly shown) may "access" the depth representation by generating the depth representation. Once the virtual reality dataset has been put together (e.g., by system 100 or other components of a virtual reality provider system within which system 100 is included), communication facility 102 may provide the virtual reality dataset to a media player device by way of a network. In some examples, communication facility 102 may provide the virtual reality dataset to the media player device by way of other systems that are included within the virtual reality provider system (e.g., other systems downstream from system 100).

The virtual reality scene represented in the depth data of depth representation accessed by communication facility 102 may be associated with a world coordinate space, while the depth representation itself may be associated with a screen coordinate space. These and other coordinate spaces will be described in more detail below.

Processing facility 104 may be configured to perform various operations associated with processing data accessed by communication facility 102 to generate data to be transmitted back out and provided to other systems by communication facility 102. For example, upon receiving the depth representation from communication facility 102, processing facility 104 may be configured to divide the depth representation into a plurality of sections associated with a plurality of different clip coordinate spaces. Processing facility 104 may then perform various similar operations with respect to each of these sections in the plurality of sections. For example, referring to a particular section associated with a particular clip coordinate space, processing facility 104 may determine a lowest non-null depth value and a highest non-null depth value represented in the particular section of the depth representation. Based on these lowest and highest non-null depth values, processing facility 104 may generate an inverse view-projection transform for transforming depth values from the particular clip coordinate space to the world coordinate space. Processing facility 104 may then convert an original set of depth values represented in the particular section of the depth representation (i.e., original depth values accessed by communication facility 102) to a compressed set of depth values normalized based on the lowest and highest non-null depth values represented in the particular section. The depth values in the compressed set of depth values may be represented using fewer data bits than the depth values in the original set of depth values, and it may be advantageous, for various reasons described above, for communication facility 102 to provide the compressed depth values to the media player device by way of the network instead of the original depth values.

Storage facility 106 may maintain any suitable data received, generated, managed, analyzed, maintained, used, and/or transmitted by facilities 102 and 104 in a particular implementation. For example, storage facility 106 may include depth data (e.g., original depth representations, processed depth representations, compressed depth representations, etc.), data representative of the sections into which a depth representation has been divided, data indicating lowest and highest non-null depth values for each section, data representative of transforms between different coordinate spaces (e.g., including inverse view- projection transforms), and so forth. Additionally, storage facility 106 may include program instructions and/or other data used by facilities 102 and 104 in performing the operations described herein.

Figure 2:
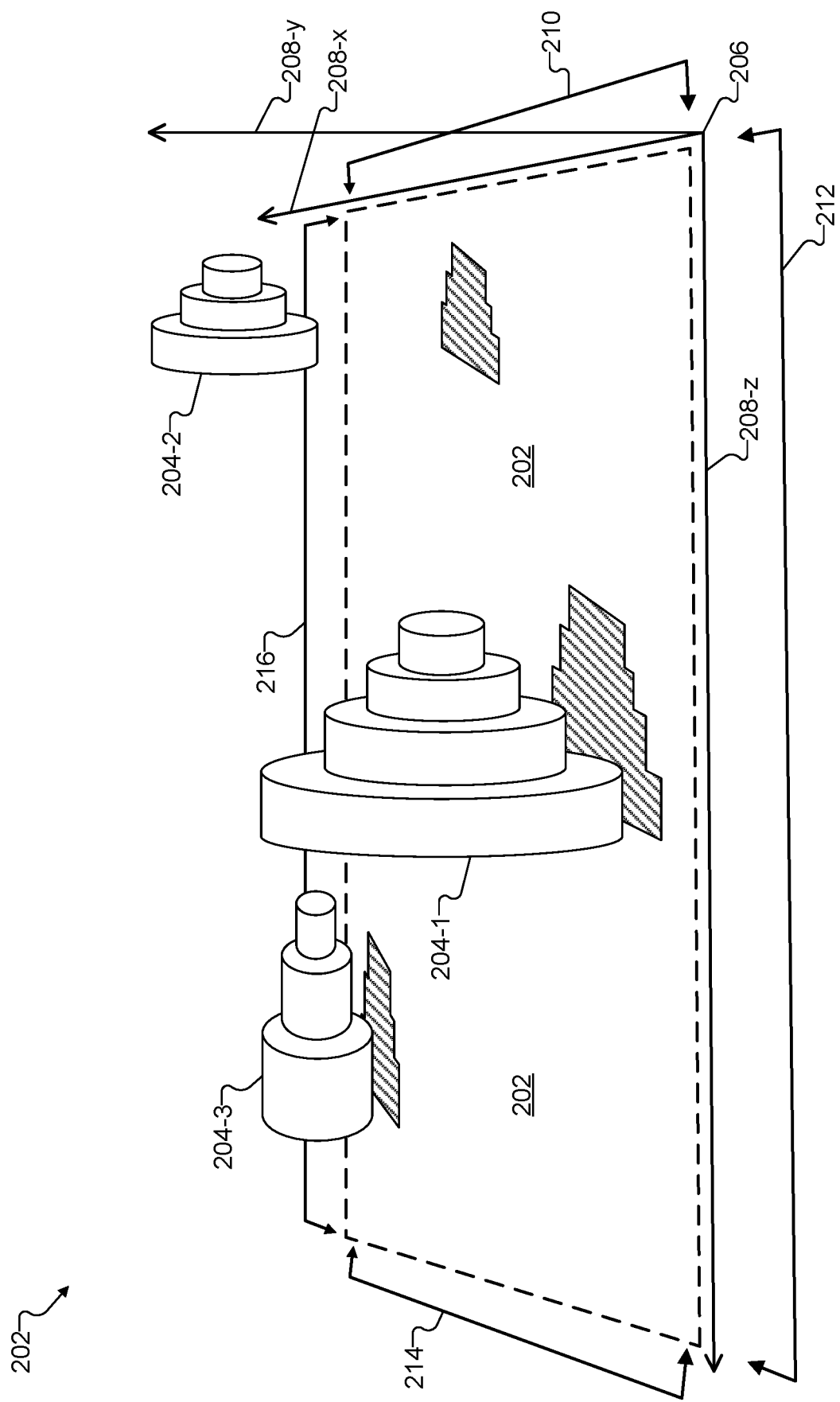
FIG. 2 illustrates a perspective view of an exemplary virtual reality scene according to principles described herein.

FIG. 2 illustrates a perspective view of an exemplary virtual reality scene 202. Virtual reality scene 202 may represent any type of scene that may be presented to a user to experience using virtual reality technology. For example, virtual reality scene 202 may represent any real-world or virtualized, indoor or outdoor, location, event, landscape, structure, or the like. In some examples, virtual reality scene 202 may be based on a real-world scene and generated based on color and depth data captured by color and depth capture devices such as video cameras and depth detectors (e.g., structured light detectors, time-of-flight detectors, etc.) that are disposed at different locations around the real-world scene. In other examples, virtual reality scene 202 may be based on a purely virtualized scene and generated based on color and depth data generated (e.g., rendered) by a three-dimensional rendering engine. Regardless of what virtual reality scene 202 is based on or the manner in which it is generated, virtual reality scene 202 may be rendered and presented to a user based on color data and depth data representative of virtual reality scene 202 and various objects included within it.

As used herein, "color data" may broadly include any image data, video data, or the like, whether represented in color or grayscale, that represents how an object included within a virtual reality scene may appear at a particular time from a particular vantage point. Color data is not limited to any particular format, file type, frame rate, resolution, quality level, or other characteristic that may be associated with various definitions and/or standards defining image data and/or video data in the art.

Similarly, as used herein, "depth data" may include any data representative of a position of a subject in space, particularly with respect to a particular vantage point. For example, depth data may depict a different type of representation of an object from a same vantage point as a color representation of the object. Specifically, rather than depicting the visible appearance of the object (i.e., representing in color or grayscale how light interacts with the surfaces of the object), depth data may depict the depth (i.e., the distance or position) of each point on the surface of the object with respect to the vantage point. As with color data, depth data may be captured, formatted, transmitted, and represented in any suitable form. For example, as will be illustrated in more detail below, depth data may be represented by a certain number of bits per pixel (e.g., 8 bits, 16 bits, 32 bits, or more in many practical examples, or three to four bits in the simplified examples described herein), which may be encoded in an image as a shade of gray. For example, four-bit grayscale image data may depict, for each pixel in the image, how far away the point represented by that pixel is from the vantage point by using darker shades of gray for closer points and using lighter shades of gray for farther points, or vice versa.

Objects 204 (e.g., objects 204-1 through 204-3) are illustrated in FIG. 2 as being included within virtual reality scene 202. Objects 204, as depicted in FIG. 2, are shown to have a particular shape like a progression of cylinders of different sizes. As will be made apparent below, this shape will help illustrate certain principles described herein. However, it will be understood that objects included within a virtual reality scene may generally have any shape or take any form as may serve a particular implementation. For example, objects 204 may represent animate or inanimate "objects" such as people, animals, things, substances, structures, fluids, and so forth. In other words, objects 204 may represent anything that may be presented to a user experiencing virtual reality scene 202 that the user will be able to see or otherwise perceive within the scene.

As shown, virtual reality scene 202 and objects 204 included therein may all be positioned and oriented with respect to a world coordinate space 206 having three-dimensional axes 208 including an x-axis 208-$x$, a y-axis 208-$y$, and a z-axis 208-$z$. The origin of world coordinate space 206 may be located at any arbitrary point in space (e.g., such as the origin point shown in FIG. 2). As further shown, virtual reality scene 202 and the objects 204 included therein may be captured, generated, represented, and/or viewed from various vantage points such as a straight-on vantage point 210, a left-side vantage point 212, a back-side vantage point 214, a right side vantage point 216, or any other suitable vantage point as may serve a particular implementation.

When color and/or depth data is generated to form an image or a depth representation from a particular vantage point (e.g., the position of a physical or virtual video camera, depth detector, or other physical capture device or virtual vantage point), the vantage point may be associated with a particular coordinate space referred to herein as a "camera coordinate space," while the image or depth representation itself may be associated with a particular coordinate space referred to herein as a "screen coordinate space." Each object 204 may appear to be positioned and oriented in different locations and in different ways depending on the vantage point from which one observes the objects, and different vantage points may be associated with distinct camera coordinate spaces to account for these differences. Similarly, when a three-dimensional scene in represented within a two-dimensional matrix of pixels (i.e., within an image or a grayscale depth representation), the two-dimensional matrix may also be associated with a distinct screen coordinate space with axes corresponding to the length and width of the screen and the apparent depth of object surfaces represented by each pixel.

Along with these different coordinate spaces, however, FIG. 2 illustrates that virtual reality scene 202 and objects 204 may further be positioned with respect to a universal coordinate space that is associated with virtual reality scene 202 itself and hence does not change based on vantage point. For example, as shown, world coordinate space 206 may be an example of such a universal coordinate space, and it will be understood that the position, orientation, rotation, etc., of each object 204 included within virtual reality scene 202 may be described relative to one another and relative to virtual reality scene 202 itself using world coordinate space 206.

As used herein, a vantage point may define various aspects related to how object surfaces within a representation (e.g., a color image or a depth representation) are captured, depicted, represented, and so forth. For example, the vantage point may define whether a representation is from a perspective of a particular point in space (and, if so, where that point in space is, what direction or orientation from that point in space the image represents, etc.) or whether the representation is orthographic. An orthographic vantage point may refer to a vantage point from which a representation of color data and/or depth data may be generated orthographically. In other words, this may refer to a projection in which 3D surfaces of 3D objects are projected onto a two-dimensional projection plane by means of a parallel projection in which projection lines are all orthogonal to the projection plane. Color and/or depth representations from orthographic vantage points may be beneficial for various reasons. For example, as compared to perspective projections, orthographic projections may have reduced overlap and, thus, reduced data redundancy. Additionally, orthographic representations may facilitate a uniform segmentation of a virtual reality scene into rectangular cells, whereas frustum bounds associated with perspective projections may make perspective projections more complicated and/or difficult to align. Additionally, fewer orthographic projections may be used to uniformly sample a rectangular volume as compared to a number of perspective projections used to uniformly sample the same volume.

Vantage points 210 through 216 are shown to be orthographic vantage points in this example, and are shown to be distributed so as to capture virtual reality scene 202 from four different points of view (i.e., front, left, back, and right). Specifically, vantage points 210 through 216 are represented in FIG. 2 as long lines having arrows at either side to suggest the non-perspective, orthographic nature of these vantage points. However, it will be understood that, in other examples, other types of vantage points (e.g., perspective vantage points) positioned at these or other locations around, within, above, or below virtual reality scene 202 may additionally or alternatively be employed.

Figure 3:
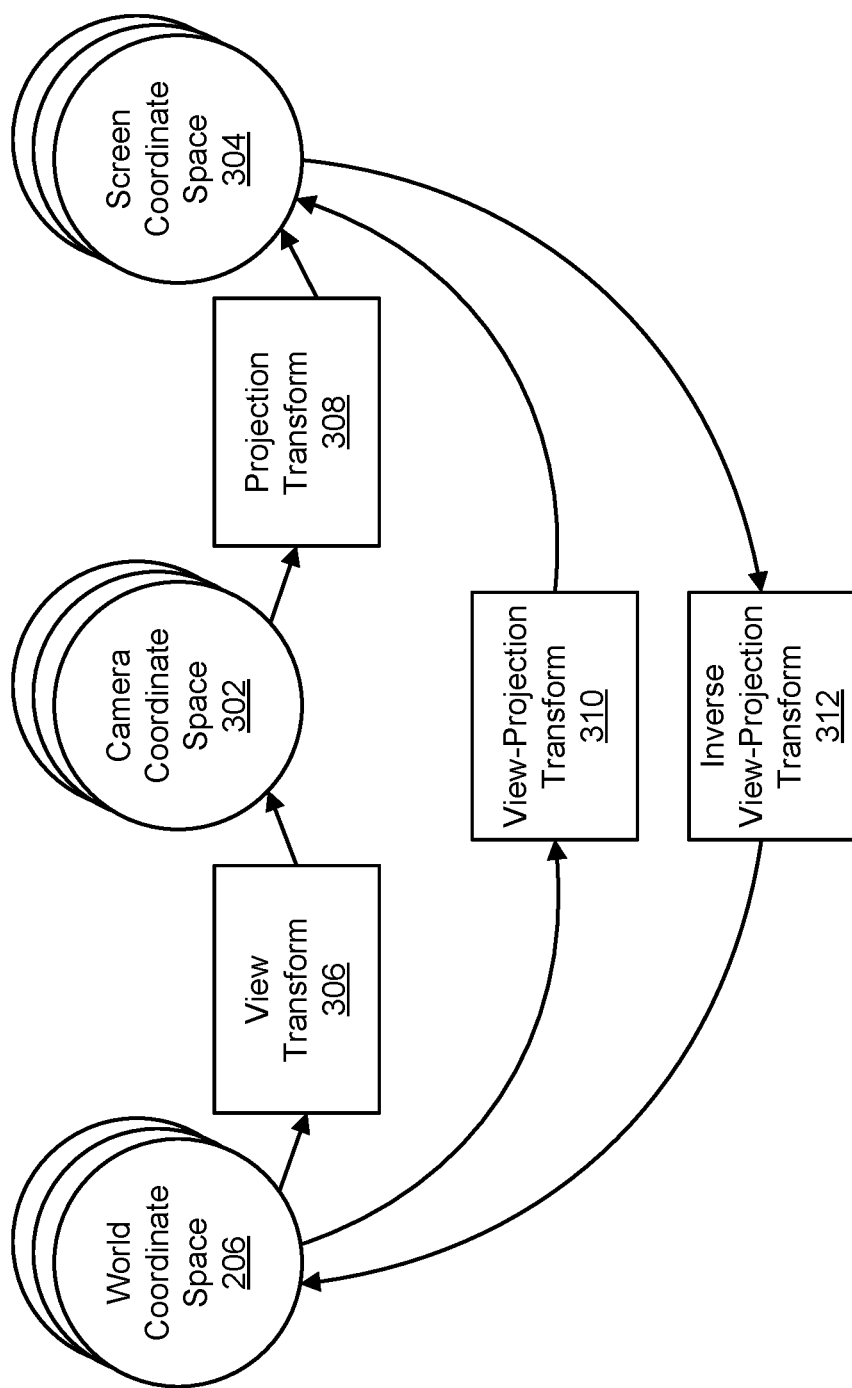
FIG. 3 illustrates exemplary coordinate spaces and exemplary transforms for transforming data values between the coordinate spaces according to principles described herein.

FIG. 3 illustrates some of the coordinate spaces described above and exemplary transforms for transforming data values (e.g., color or depth data values) between the coordinate spaces. Specifically, FIG. 3 illustrates world coordinate space 206 (the universal coordinate space associated with virtual reality scene 202 as described above) and its relation to a camera coordinate space 302 and a screen coordinate space 304. For example, camera coordinate space 302 may be associated with vantage point 210, and screen coordinate space 304 may be associated with representations (e.g., images and/or depth representations) generated from vantage point 210. It will be understood that, while world coordinate space 206 is general to all vantage points of virtual reality scene 202, camera coordinate space 302 and screen coordinate space 304 are specific to a particular vantage point (i.e., vantage point 210 in this example). As such, it will be understood that additional camera coordinate spaces and additional screen coordinate spaces associated with other vantage points (e.g., vantage points 212, 214, 216, and other vantage points not explicitly shown in FIG. 2) may also exist and relate to world coordinate space 206 in similar ways (e.g., by way of similar transforms), although these coordinate spaces are not explicitly illustrated in FIG. 3 for simplicity.

As shown in FIG. 3, each of the three coordinate spaces shown is depicted using three overlapping circles to suggest the three dimensions (i.e., x, y, and z) being represented by the respective coordinate space. It will be understood that, while screen coordinate space 304 may only describe the two-dimensional space of a flat matrix of pixels on a screen, a third depth dimension may still be described by depth data points in screen coordinate space 304 not by position on the screen (as with the x and y coordinates), but by a grayscale depth value. Accordingly, at least for depth representations, screen coordinate space 304 may describe three dimensions of space just like world coordinate space 206 and camera coordinate space 302, rather than just two dimensions of space.

Rectangular boxes are depicted in FIG. 3 to illustrate various transforms by way of which depth data representative of object surfaces with respect to one coordinate space may be transformed to represent the same object surfaces in a different coordinate space. For example, a view transform 306 may enable depth data to be transformed between world coordinate space 206 and camera coordinate space 302, and a projection transform 308 may enable depth data to be transformed between camera coordinate space 302 and screen coordinate space 304. These transforms may be implemented in any manner as may serve a particular implementation. For instance, view transform 306 and projection transform 308 may be implemented by respective matrices (e.g., 4×4 matrices) by way of which arrays of points (e.g., surfaces, objects, etc.) represented in the first coordinate space may be readily converted to the second coordinate space using mathematical operations performed by system 100.

In some examples, transforms such as view transform 306 and projection transform 308 may be combined (e.g., using matrix multiplication or the like) to generate a single transform that performs the role of both transforms sequentially. For example, a view-projection transform 310 may be implemented as a combination of view transform 306 and projection transform 308 such that view-projection transform 310 may enable depth data in world coordinate space 206 to be transformed directly to screen coordinate space 304 without passing through camera coordinate space 302. In the end, this may result in equivalent depth data as would result from a sequential application of both view transform 306 and projection transform 308. Additionally, as shown, matrix operations may also allow for inverse transforms to be generated or derived that go in an opposite direction from the original transforms. For example, an inverse view-project transform 312 is shown that enables depth data to be converted from screen coordinate space 304 directly to world coordinate space 206.

Figure 4:
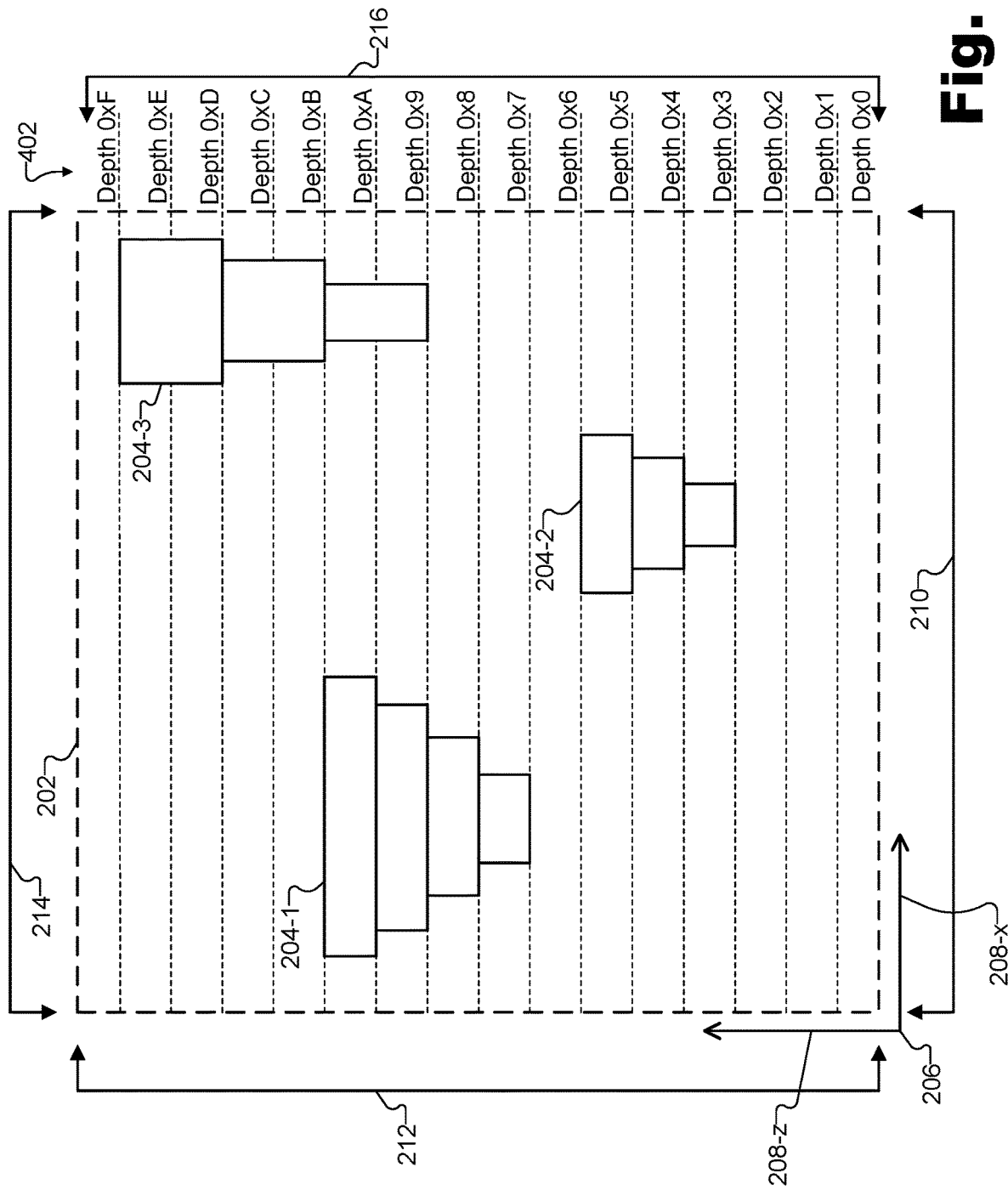
FIG. 4 illustrates a top view of the exemplary virtual reality scene of FIG. 2 in accordance with an example that represents depth values according to principles described herein.
Figure 5:
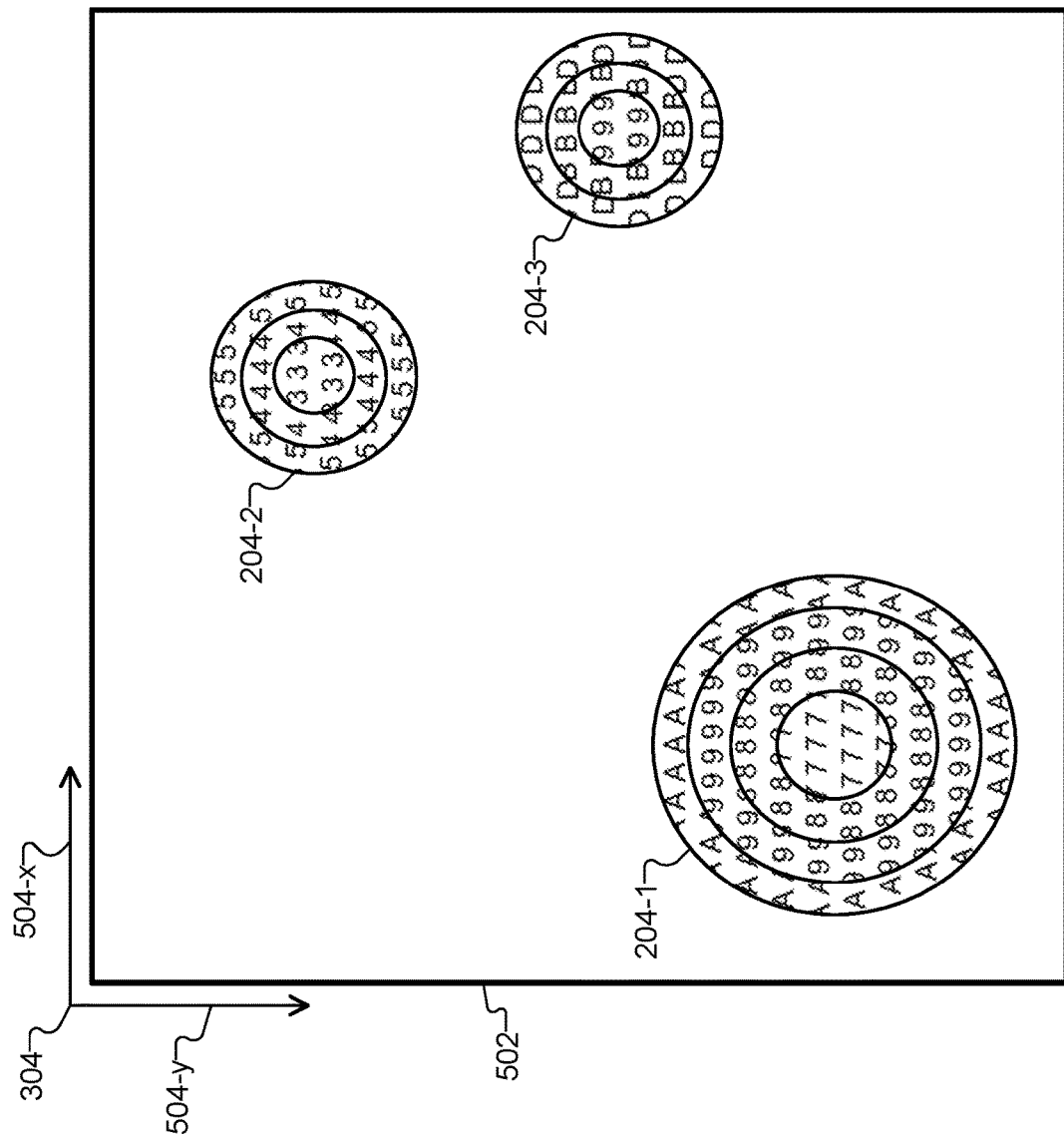
FIG. 5 illustrates a front view of the exemplary virtual reality scene of FIG. 2 in accordance with the example of FIG. 4 according to principles described herein.

FIGS. 4 through 7 depict different views of virtual reality scene 202 to illustrate how compression of depth data may result in loss of detail and depth precision when the methods and systems for preserving precision in compressed depth data described herein are not employed. Specifically, FIG. 4 illustrates a top view of virtual reality scene 202 in accordance with an example that represents depth values using a particular number of bits (i.e., four bits, in this example). For instance, FIG. 4 may correspond to a view of how virtual reality scene 202 would be represented by a set of original (i.e., non-compressed) depth values captured or generated by a system or device from which system 100 accesses a depth representation. FIG. 5 illustrates a front view of virtual reality scene 202 in accordance with this same four-bit example.

Figure 6:
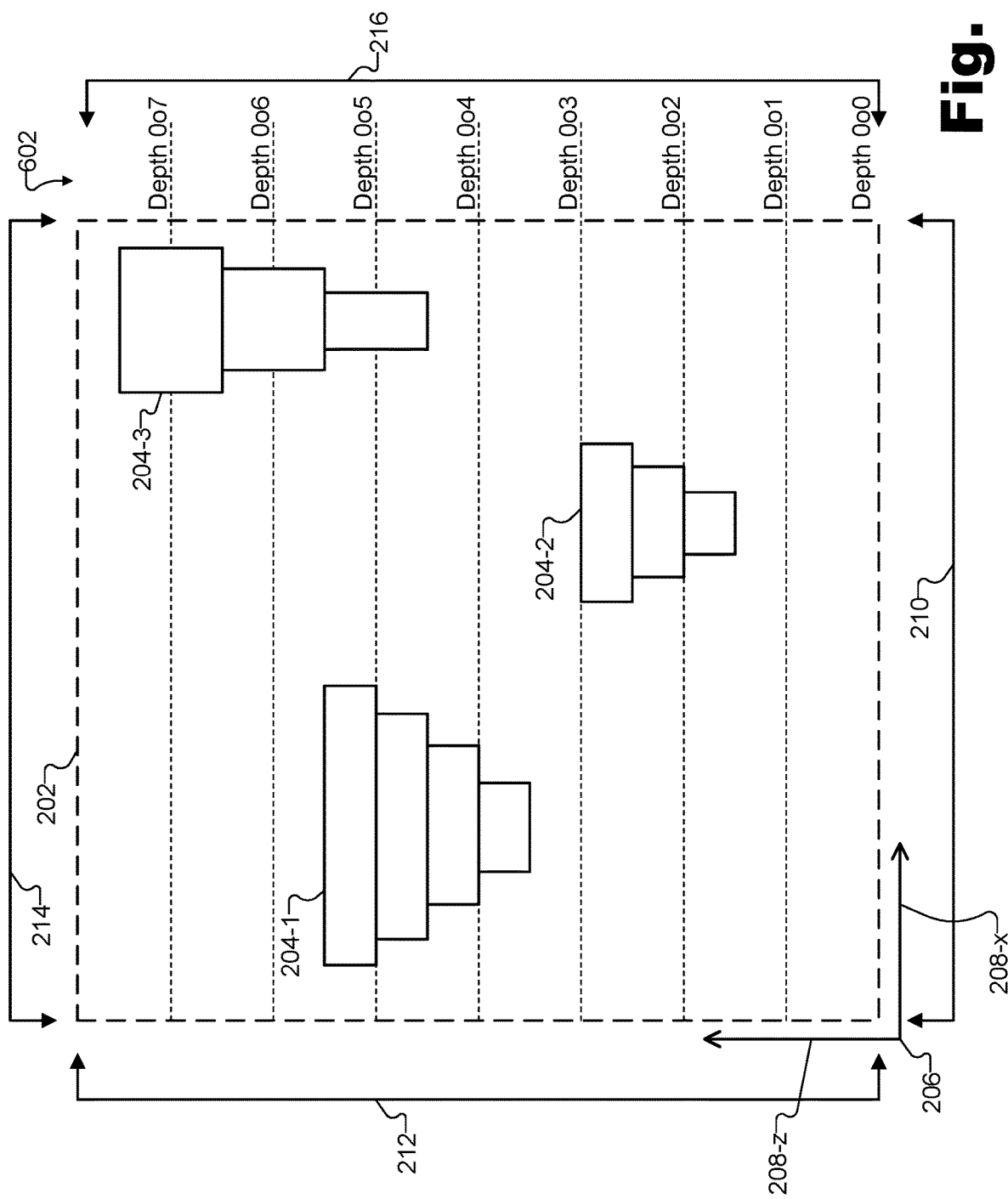
FIG. 6 illustrates a top view of the exemplary virtual reality scene of FIG. 2 in accordance with an example that represents depth values according to principles described herein.
Figure 7:
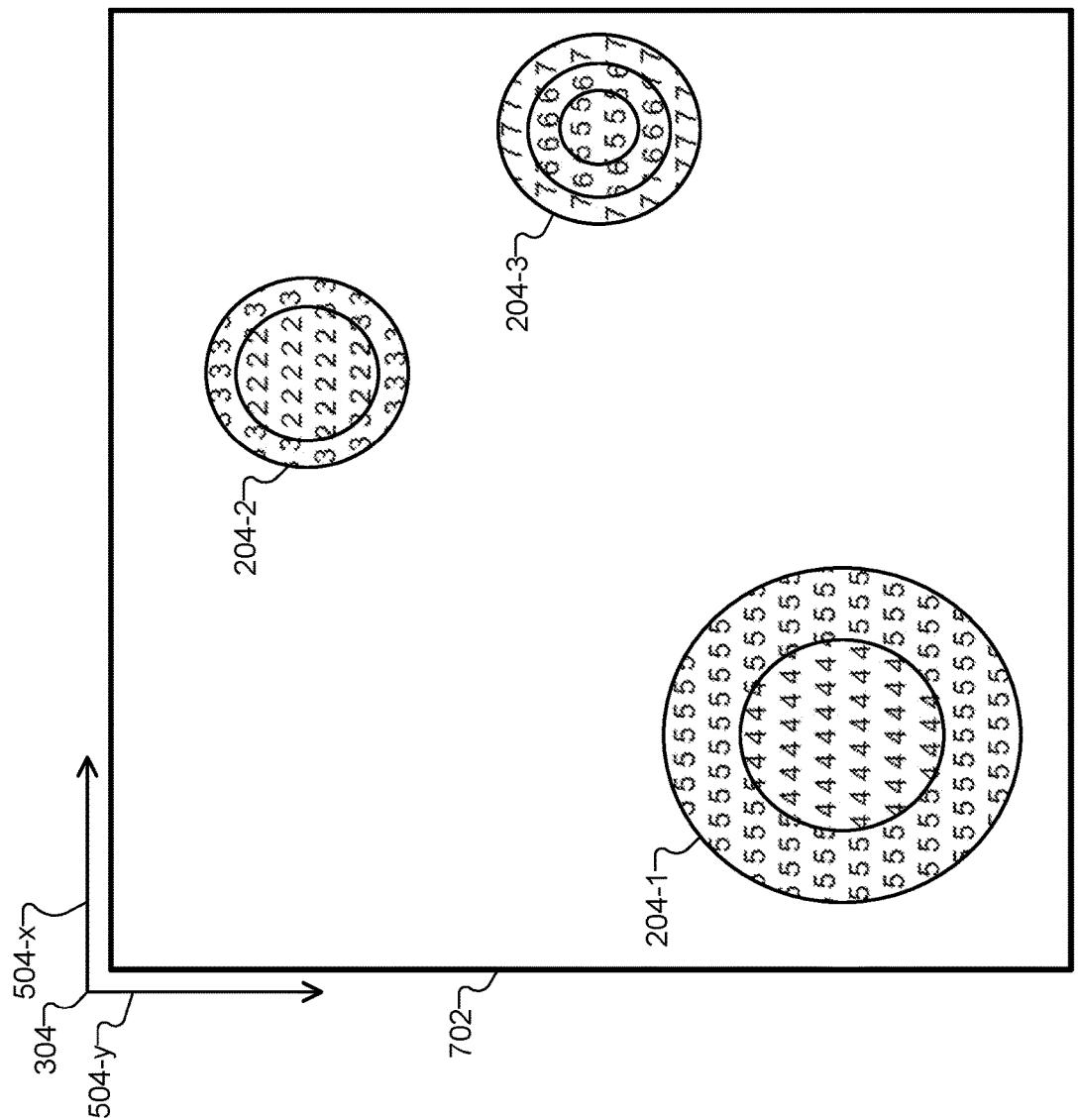
FIG. 7 illustrates a front view of the exemplary virtual reality scene of FIG. 2 in accordance with the example of FIG. 6 according to principles described herein.

FIG. 6 then illustrates a top view of virtual reality scene 202 in accordance with an example that represents depth values using a reduced number of bits (i.e., three bits, in this example). For example, FIG. 6 may correspond to a view of how virtual reality scene 202 would be represented by a set of compressed depth values into which the set of original depth values is converted during the compression process. FIG. 7 illustrates a front view of virtual reality scene 202 in accordance with this same three-bit example. Each of FIGS. 4 through 7 will now be described in more detail to illustrate how compression may result in depth precision loss.

FIG. 4 shows, from the top view, virtual reality scene 202, objects 204 included within virtual reality scene 202, the relevant axes 208 of world coordinate space 206, and each of vantage points 210 through 216, as described above. Additionally, along the side of virtual reality scene 202, FIG. 4 depicts different four-bit depth levels 402 from the perspective of vantage point 210. Depth levels 402 are depicted using a hexadecimal notation (designated herein with the prefix "0x") in which, for example, "Depth 0x0" corresponds to a four-bit binary value (designated herein with the prefix "0b") of 0b0000, "Depth 0x1" corresponds to a four-bit binary value of 0b0001, and so forth up until "Depth 0xF," which corresponds to a four-bit binary value of 0b1111. While a four-bit representation is depicted in FIG. 4 for representing original, non-compressed depth values, it will be understood that any suitable number of bits may be used for this purpose in other implementations. For example, in a real-world implementation, many more than four bits may be used to provide a significantly larger depth precision than is shown for the demonstrative purposes of FIG. 4. In certain practical examples, for instance, 8 bits, 16 bits, 32 bits, or any other suitable number of bits may be used to provide a greater resolution and precision of depth than is shown in the examples herein.

As shown in FIG. 4, different surfaces of object 204-1 may be detected to be at different depth levels 402. For example, a closest portion of object 204-1 to vantage point 210 is shown to have a depth level of 0x7 (i.e., 0b0111), followed by portions having depth levels of 0x8 (i.e., 0b1000), 0x9 (i.e., 0b1001), and 0xA (i.e., 0b1010). Similarly, a closest portion of object 204-2 to vantage point 210 has a depth level of 0x3 (i.e., 0b0011), followed by portions having depth levels of 0x4 (i.e., 0b0100) and 0x5 (i.e., 0b0101). Object 204-3 has thicker portions than the other objects, such that each portion of object 204-3 takes up two depth levels 402. Thus, as shown, a closest portion of object 204-3 to vantage point 210 has a depth level of 0x9 (i.e., 0b1001), followed by portions having depth levels of 0xB (i.e., 0b1011) and 0xD (i.e., 0b1101). While depth levels 402, the depth levels associated with a camera coordinate space of vantage point 210, are the only depth levels explicitly depicted by FIG. 4, it will be understood that other similar depth levels may be associated with other camera coordinate spaces of other vantage points around virtual reality scene 202. For example, camera coordinate spaces corresponding to vantage points 212, 214, and 216 may each be associated with their own respective sets of depth levels (not explicitly shown). Regardless of which camera coordinate space a particular depth value may be detected from, however, each detected depth value may be associated with a particular point in space in relation to world coordinate space 206 (e.g., a point that may be derived using an inverse view transform from the particular camera coordinate space to world coordinate space 206).

FIG. 5 depicts a front view of virtual reality scene 202 and objects 204 included therein. More specifically, FIG. 5 illustrates a depth representation 502 that may be generated with respect to vantage point 210. Depth representation 502 may represent depth values for objects 204 as viewed from vantage point 210 in any manner. For example, depth representation 502 may be a grayscale image composed of a matrix of pixels representing x and y coordinates, with each pixel storing a value (e.g., a four-bit value, in this example) that may be displayed in some examples as a particular shade of gray. Closer surfaces to vantage point 210 may be slightly darker shades of gray and further surfaces may be lighter shades of gray, or vice versa, as described above. For clarity of illustration, different shades of gray are not shown in FIG. 5, but, rather, are illustrated with hexadecimal numbers corresponding to depth levels 402 illustrated in FIG. 4. For example, in accordance with FIG. 4 above, FIG. 5 shows the closest surface of object 204-1 as having a depth value of 0x7 (depicted as a pattern of 7s), the next surface around that portion as having a depth value of 0x8 (depicted as a pattern of 8s), and so forth.

Because FIG. 5 illustrates not only a front view of virtual reality scene 202 but, more specifically illustrates a depth representation of the front view, FIG. 5 does not explicitly show world coordinate space 206, but rather depicts screen coordinate space 304, described above. As shown, screen coordinate space 304 includes an x-axis 504-x and a y-axis 504-y that do not align with axes 208-x and 208-y of world coordinate space 206, but which may have known relationships with these axes (e.g., relationships encoded in one or more transforms between screen coordinate space 304 and world coordinate space 206). Accordingly, it will be understood that depth values included within depth representation 502, each of which may be defined as having an x and a y coordinate based on the pixel position and a z coordinate based on the four-bit depth level 402 associated with that pixel, may be transformed to respective locations with respect to world coordinate space 206 using transforms described herein.

Within depth representation 502, various pixels are shown to be associated with various depth values (i.e., depth values corresponding to depth levels 402 including levels 0x7 through 0xA for object 204-1; depth levels 0x3 through 0x5 for object 204-2; and depth levels 0x9, 0xB, and 0xD for object 204-3). However, it is noted that the majority of pixels in depth representation 502 are not explicitly associated with any particular depth value, and are thus left blank (i.e., shown as white space within depth representation 502). As used herein, the depth values associated with such pixels may be referred to as "null depth values" and, rather than being associated with some particular depth, may be associated with no depth at all (i.e., because there is no detectable object surface near or far from vantage point 210 for these pixels). Conversely, the depth values shown for the surfaces of objects 204 (i.e., the depth values depicted by the hexadecimal numbers in depth representation 502) may be referred to herein as "non-null depth values."

FIGS. 6 and 7 are similar to FIGS. 4 and 5, respectively, but illustrate an example where depth values are represented using only three bits. For example, as mentioned above, a four-bit depth representation such as depth representation 502 may be captured or rendered by a virtual reality provider system, but, to save bandwidth and resources, this may be converted or compressed to a three-bit depth representation. As shown by FIGS. 6 and 7, this compression may be beneficial in resulting in a depth representation that uses less data (and is thus more manageable, easy to transmit, etc.) but may also result in an undesirable loss of depth precision.

Specifically, like FIG. 4, FIG. 6 shows, from the top view, virtual reality scene 202, objects 204 included within virtual reality scene 202, the relevant axes 208 of world coordinate space 206, and each of vantage points 210 through 216, as described above. Additionally, along the side of virtual reality scene 202, FIG. 6 depicts different three-bit depth levels 602 from the perspective of vantage point 210. Depth levels 602 are depicted using an octal notation (designated herein using a prefix of "0o") in which, for example, "Depth 0o0" corresponds to a three-bit binary value of 0b000, "Depth 0o1" corresponds to a three-bit binary value of 0b001, and so forth up until "Depth 0o7," which corresponds to a three-bit binary value of 0b111. While a three-bit representation is depicted in FIG. 4 for representing processed, compressed depth values, it will be understood that any suitable number of bits may be used for this purpose in other implementations. For example, in a real-world implementation where, for instance, original depth values are represented using 32 bits, a smaller number of bits such as 16 bits or 8 bits may be used to define compressed depth values.

As in FIG. 4, in FIG. 6, different surfaces of object 204-1 may be detected to be at different depth levels. However, while depth levels 402 in FIG. 4 offered sufficient precision to uniquely represent each different surface on each object 204, the same cannot be said for depth levels 602 in FIG. 6. Specifically, for example, a closest portion of object 204-1 to vantage point 210 is shown to fall between a depth level of 0o3 (i.e., 0b011) and a depth level of 0o4 (i.e., 0b100), thus, in one example, causing the surface to be represented by a depth value corresponding to the depth level of 0o4. Already, this representation is less accurate than the four-bit representation of FIG. 4, in which a depth level 402 directly corresponding to the depth of this surface was available. However, the situation is made worse still when the other portions of object 204-1 are considered. The second portion is also shown to be at a depth level of 0o4 (i.e., 0b100), making its depth indistinguishable from the depth of the first portion. This represents a loss of depth precision from the four-bit example, since the three-bit depth representation has lost the capability of uniquely representing each of the distinct portions of object 204-1.

Similarly, the two furthest portions of object 204-1 may both be assigned depth values associated with depth level 0o5 (i.e., 0b101) in this representation, rather than having distinct depth values associated with different depth levels. Object 204-2 may likewise lose depth precision and accuracy in the same way since its total depth may only span two depth levels (i.e., depths levels 0o2 and 0o3) even though it includes three distinct surfaces at distinguishable depth levels. Note that object 204-3 does not suffer a loss of depth precision when represented with respect to three-bit depth levels 602 because of its wider portions. However, object 204-3 now maximizes the depth precision capabilities of the three-bit representation and still is affected by a loss of depth accuracy because three-bit depth levels 0o5 through 0o7 do not line up perfectly with its surfaces as did four-bit depth levels 0x9, 0xB, and 0xD.

FIG. 7 depicts another front view of virtual reality scene 202 and objects 204 included therein. More specifically, similar to depth representation 502 in FIG. 5, FIG. 7 illustrates a depth representation 702 that has been generated with respect to vantage point 210 and represents a grayscale image composed of a matrix of pixels representing x and y coordinates, with each pixel storing a value (e.g., a three-bit value, in this example) that may be displayed as a particular shade of gray, or, for clarity of illustration in this example, as an octal number pattern corresponding to depth levels 602 illustrated in FIG. 6. For example, in accordance with FIG. 6 above, FIG. 7 shows the two closest surfaces of object 204-1 as having a same depth value of 0o4 (i.e., 0b100), the two furthest surfaces of object 204-1 as having a same depth value of 0o5, and so forth. Accordingly, while depth representation 702 of FIG. 7 advantageously requires less data to represent than depth representation 502 of FIG. 5, depth representation 702 does not match FIG. 5 in terms of depth precision and/or accuracy. Indeed, as shown in FIG. 7 and as described above in relation to FIG. 6, only object 204-3 is represented in depth representation 702 without a loss of data precision (i.e., due to the thicker portions and further distances between the surfaces of object 204-3), and the representations of all three objects 204 have at least some degree of depth accuracy loss.

System 100 may be configured to remedy the deficiencies of a compressed depth representation such as depth representation 702. For example, rather than using the reduced number of bits to represent the entire depth range that may be needed to represent every pixel in a particular depth representation, system 100 may divide an original depth representation into different sections, determine different respective depth ranges needed to represent each section (e.g., depth ranges that are smaller than may be needed to represent the entire depth representation), and maximize the use of the reduced number of bits for each section by using the bits to separately cover the different ranges of each section. Examples of different sections and how a reduced number of depth bits may be separately used to preserve depth precision and/or accuracy in compressed depth representations will be described and illustrated in more detail below.

Figure 8:
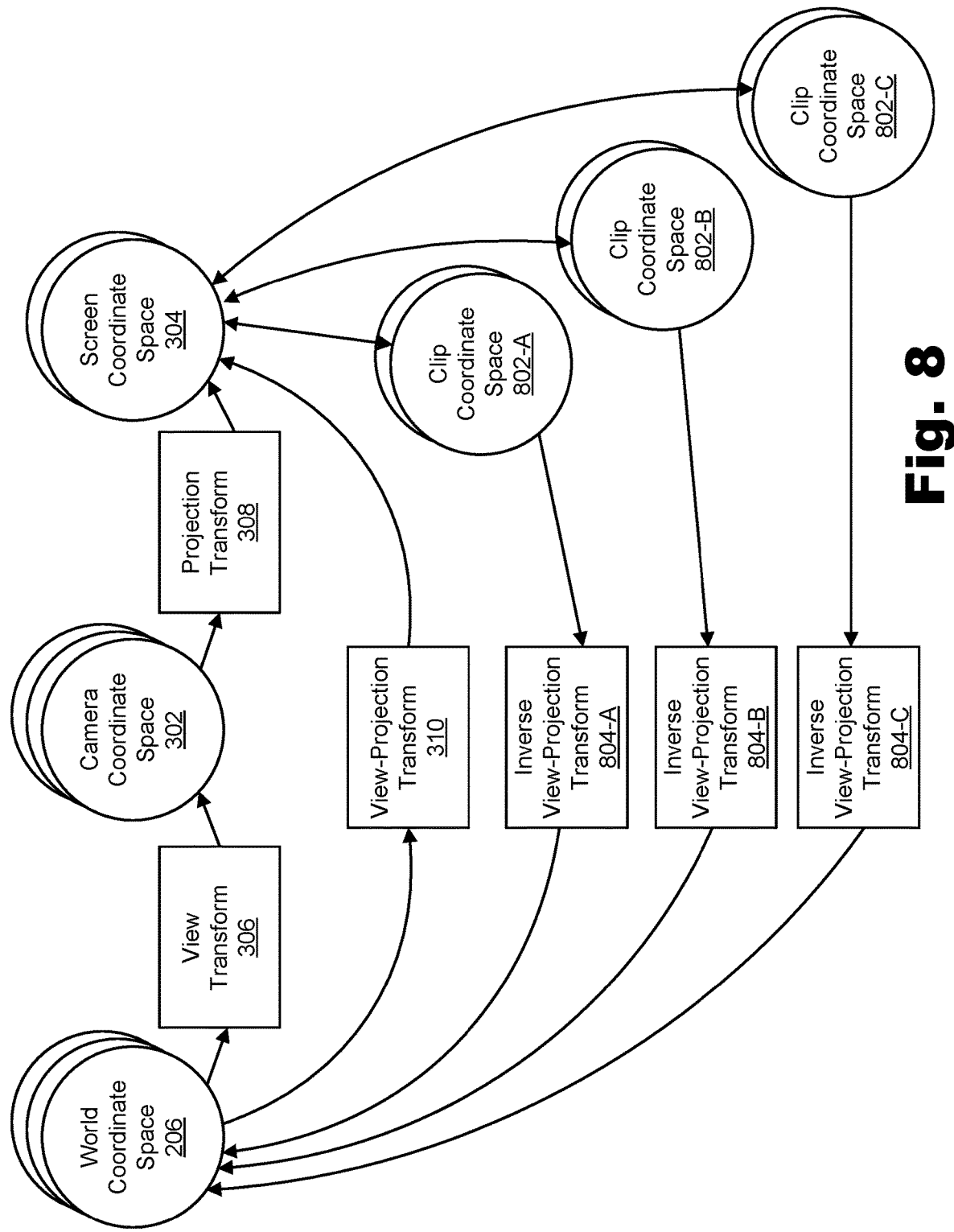
FIG. 8 illustrates the exemplary coordinate spaces and exemplary transforms of FIG. 3 along with additional exemplary coordinate spaces and additional exemplary transforms for transforming data values between the coordinate spaces according to principles described herein.

To process depth values within different sections of a depth representation separately in this way, system 100 may define different clip coordinate spaces within a given screen coordinate space. For example, FIG. 8 illustrates the exemplary coordinate spaces and transforms of FIG. 3 (i.e., coordinate spaces 206, 302, and 304, and transforms 306, 308, and 310) along with several clip coordinate spaces 802 (e.g., clip coordinate spaces 802-A through 802-C) and respective inverse view-projection transforms 804 (e.g., inverse view-projection transforms 804-A through 804-C) for transforming data values (e.g., depth values) from the clip coordinate space to world coordinate space 206.

Each clip coordinate space 802 may correspond to a different section of screen coordinate space 304, which, as described above, may correspond to an entire depth representation. For example, each axis of a particular clip coordinate space 802 may be defined between discrete end values (e.g., between 0 and 1, between −1 and 1, etc.), and may clip any values that do not fall within that range (i.e., such that values outside the range are not representable within the clip coordinate space). A transform may not be required to convert depth values between a given clip coordinate space 802 and screen coordinate space 304, but, rather, the conversion may be accomplished by relatively simple scaling operations. In certain examples, each clip coordinate space 802 may be implemented as a normalized cubic space, whereas, in other examples clip coordinates spaces may have other shapes (e.g., rectangular prism shapes or the like).

As will be illustrated below, each clip coordinate space 802 may cover depth values in only a limited portion of space associated with virtual reality scene 202. For example, the x and y dimensions of a clip coordinate space 802 may extend only to the limits imposed by the sectioning of the depth representation (i.e., so that only pixels included within a particular section are representable within the coordinate space), and the z dimension of the clip coordinate space 802 may extend only over a range from a lowest non-null depth value to a highest non-null depth value included within the section. In this way, the usage of a reduced number of depth bits may be made more effective because bits are not wasted representing depth levels outside of the clip coordinate space (i.e., outside of the depth range for a particular section).

By using different clip coordinate spaces to cover different sections that each require representation of different depth ranges in this way, a reduced number of bits may be used to represent surface depths without compromising depth precision and/or accuracy (or at least not comprising them to as great an extent as illustrated above in relation to FIGS. 6 and 7).

These techniques thus provide all the benefits of depth compression while reducing conventional detriments associated with compression, and do so for a relatively small cost. Specifically, because a different clip coordinate space is defined for each section of the depth representation rather than the entire depth representation being associated with a single screen coordinate space, reconstruction of the depth data with respect to the universal world coordinate space requires that different transforms be associated with different clip coordinate spaces. Accordingly, as shown in FIG. 8, clip coordinate space 802-A may be associated with inverse view-projection transform 804-A to enable depth values defined with respect to clip coordinate space 802-A to be transformed into world coordinate space 206, clip coordinate space 802-B may be associated with inverse view-projection transform 804-B to enable depth values defined with respect to clip coordinate space 802-B to be transformed into world coordinate space 206, and so forth.

Inverse view-projection transforms 804 may be generated for each clip coordinate space 802 in any manner as may serve a particular implementation. For example, each of inverse view-projection transforms 804 may be based on an inverse view-projection transform between screen coordinate space 304 and world coordinate space 206 (e.g., such as inverse view-projection transform 312 illustrated in FIG. 3), but each transform may be configured (e.g., by way of scaling alterations or the like) to operate specifically for the respective clip coordinate space 802 to which it corresponds. In some examples, determining an inverse view-projection transform 802 may be performed by 1) determining view transform 306 for transforming depth values from world coordinate space 206 to camera coordinate space 302; 2) determining projection transform 308 for transforming depth values from camera coordinate space 302 to screen coordinate space 304; 3) combining view transform 306 and projection transform 308 to generate view-projection transform 310 for transforming depth values from world coordinate space 206 to screen coordinate space 304; 4) identifying a relationship between screen coordinate space 304 and the particular clip coordinate space 802 (e.g., determining a linear scaling relationship between the coordinate spaces, or the like); and 5) generating the inverse view-projection transform 804 based on view-projection transform 310 and the identified relationship between screen coordinate space 304 and the particular clip coordinate space 802.

Figure 9:
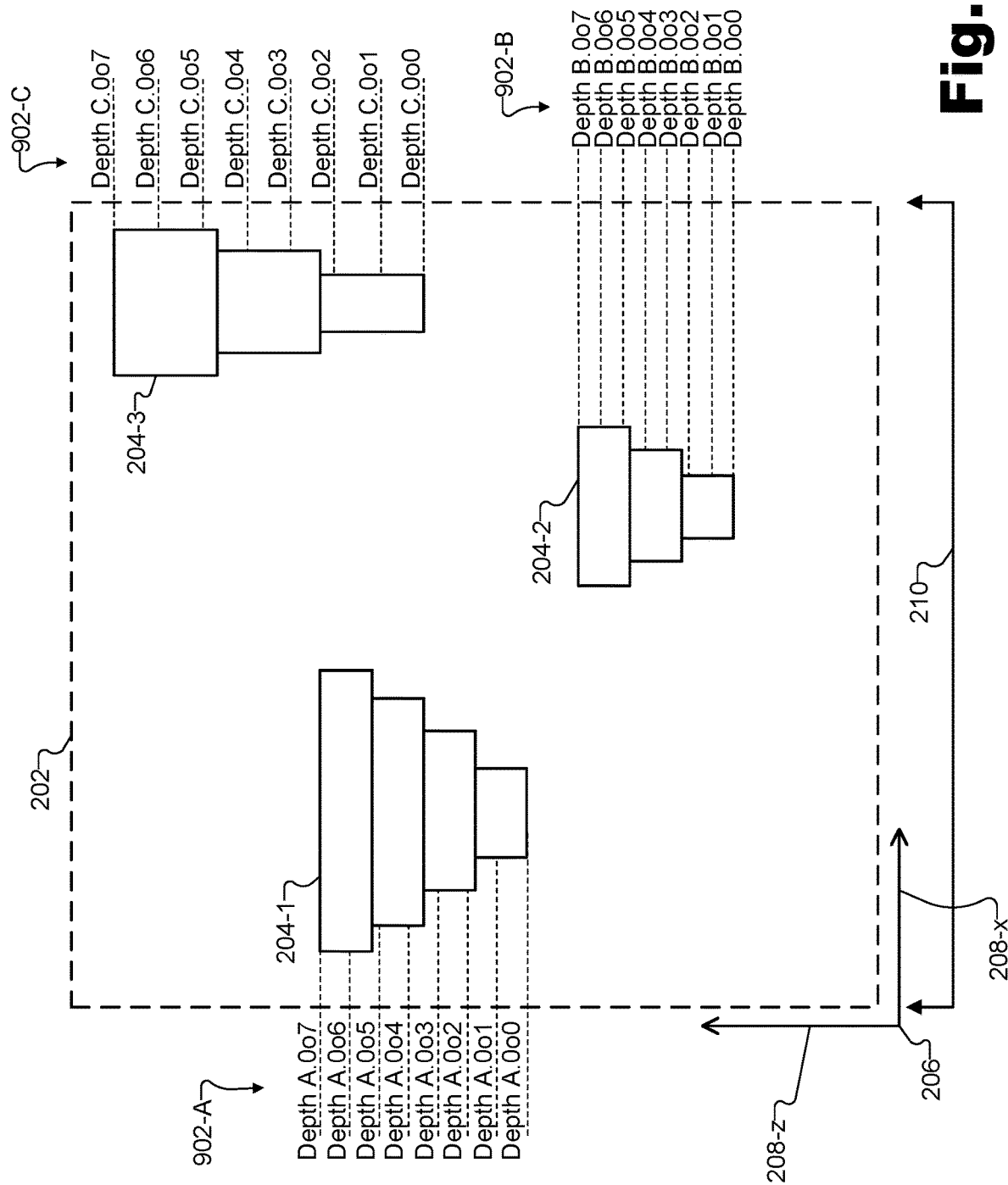
FIG. 9 illustrates a top view of the exemplary virtual reality scene of FIG. 2 in accordance with an implementation that preserves depth precision according to principles described herein.

FIG. 9 illustrates a top view of virtual reality scene 202 in accordance with an implementation that represents depth values using three bits while preserving depth precision according to principles described herein. FIG. 9 is therefore similar to FIG. 6 except that, instead of using the single system of three-bit depth levels 602 (which was shown in FIGS. 6 and 7 to result in a loss of depth precision and accuracy), FIG. 9 includes a plurality of different systems of three-bit depth levels 902 (i.e., depth levels 902-A for a section containing object 204-1, 902-B for a section containing object 204-2, and 902-C for a section containing object 204-3). Each system of depth levels 902 may be associated with a different clip coordinate space 802, as indicated by the letters with which the depths are described. For example, depth levels 902-A are notated with a prefix of "A." to indicate that the following octal number refers to clip coordinate space 802-A, depth levels 902-B are notated with a prefix of "B." to indicate that the following octal number refers to clip coordinate space 802-B, and so forth. Additionally, as with FIGS. 4 and 6 above, FIG. 9 further shows world coordinate space 206 (including axes 208-x and 208-z) and vantage point 210, from which each system of depth levels 902 is viewed.

As shown, by tailoring each of the different systems of depth levels 902 to only the depth range needed to cover a particular object 204 (rather than covering the entire potential depth of virtual reality scene 202 as with depth levels 602), depth values for each object 204 may preserve the original depth precision illustrated in FIGS. 4 and 5 even after compression to the three-bit representation. Specifically, as shown, the closest portion of object 204-1 to vantage point 210 is shown to have a depth level of A.0o0 (i.e., 0b000 in clip coordinate space 802-A), followed by portions having depth levels of A.0o2 (i.e., 0b010 in clip coordinate space 802-A), A.0o4 (i.e., 0b100 in clip coordinate space 802-A), and A.0o5 (i.e., 0b101 in clip coordinate space 802-A). Similarly, a closest portion of object 204-2 to vantage point 210 has a depth level of B.0o0 (i.e., 0b000 in clip coordinate space 802-B), followed by portions having depth levels of B.0o2 (i.e., 0b010 in clip coordinate space 802-B) and B.0o5 (i.e., 0b101 in clip coordinate space 802-B). Because object 204-3 has thicker portions than the other objects, clip coordinate space 802-C within which depth values of object 204-3 are represented may use a wider depth range. Accordingly, a closest portion of object 204-3 to vantage point 210 has a depth level of C.0o0 (i.e., 0b000 in clip coordinate space 802-C), followed by portions having depth levels of C.0o2 (i.e., 0b010 in clip coordinate space 802-C) and C.0o5 (i.e., 0b101 in clip coordinate space 802-C).

As mentioned above, in this example, no depth precision may be lost as compared to the original four-bit depth representations of FIGS. 4 and 5, despite the fact that the depth values have been compressed to use only three bits. For example, as shown, all four separate surfaces of the four portions of object 204-1 are distinguishable as having different depths, as are the three separate surfaces of the three portions of objects 204-2 and 204.3. Because the different depth levels 902 do not perfectly align with the original depth levels 402, the depth accuracy represented changes (in this case getting slightly worse since objects 204 happened to perfectly coincide with depth levels 402). However, because there are more depth levels 902 per unit distance than there were depth levels 402, it will be understood that the depth accuracy that can be represented may improve in certain examples or stay approximately the same, depending on where object surfaces happen to be located with respect to the depth levels.

As described above, the depth range covered by any particular set of depth levels 902 (i.e., any particular clip coordinate space 802) may be determined based on a lowest non-null depth value and a highest non-null depth value for the object or section covered. For example, as shown for object 204-1, the lowest non-null depth value may correspond to a point of object 204-1 that is the closest to vantage point 210 and may, by definition, be defined to have a depth of A.0o0, while the highest non-null depth value may correspond to a point of object 204-1 that is the furthest from vantage point 210 and may, by definition, be defined to have a depth of A.0o7. In other examples, the range may be determined in different ways. For instance, the depth range may be configured to cover slightly more than the actual range from the nearest to the farthest point of the object (e.g., so that lowest non-null depth value is approximately 10% of the total available depth range and the highest non-null depth value is approximately 90% of the total available depth range). As another example, the highest non-null depth value may correspond to the furthest depth perceivable from the respective vantage point. For example, from vantage point 210 for object 204-1, the range may be configured to end with a level A.0o7 at the front surface of the largest portion of object 204-1, rather than, as shown, at the back surface of that portion (because that surface is not perceivable from vantage point 210).

Figure 10:
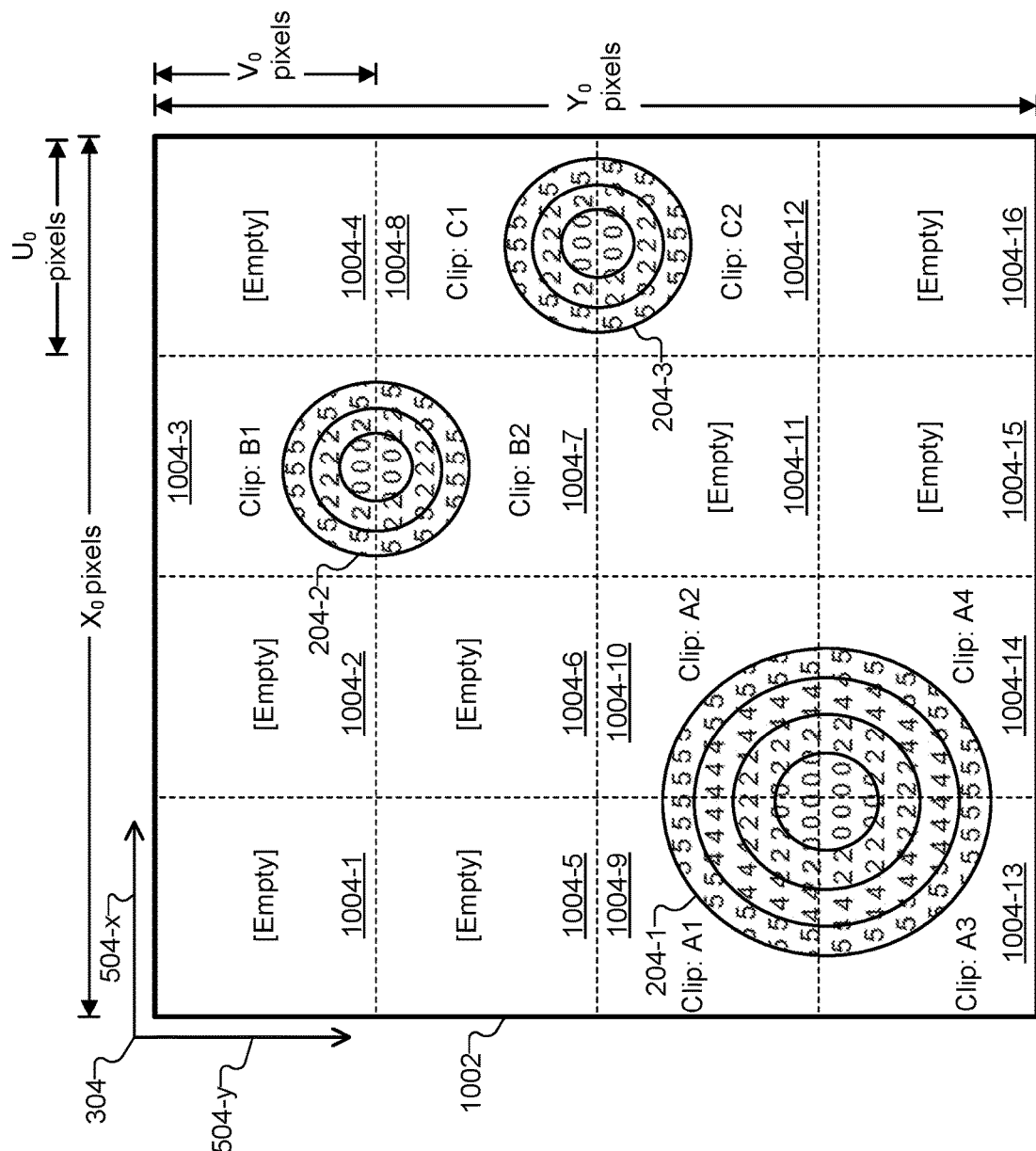
FIG. 10 illustrates a front view of the exemplary virtual reality scene of FIG. 2 in accordance with the depth precision preservation implementation of FIG. 9 according to principles described herein.

FIG. 10 depicts a front view of virtual reality scene 202 and objects 204 included therein in accordance with the three-bit depth precision preservation implementation of FIG. 9. More specifically, similar to depth representations 502 and 702 in FIGS. 5 and 7, respectively, FIG. 10 illustrates a depth representation 1002 that may be generated with respect to vantage point 210 and represents a grayscale image composed of a matrix of pixels representing x and y coordinates, with each pixel storing a value (e.g., a three-bit value, in this example) that may be displayed as a particular shade of gray, or, for clarity of illustration in this example, as a pattern of octal numbers corresponding to different systems of depth levels 902 illustrated in FIG. 9.

Whereas depth representations 502 and 702 were shown to be single, unified representations (e.g., grayscale images) in FIGS. 5 and 7, FIG. 10 shows that depth representation 1002 may be divided into a plurality of sections 1004 (i.e., sections 1004- through 1004-16). While sixteen equally-sized sections are illustrated in FIG. 10, it will be understood that system 100 may divide a depth representation such as depth representation 1002 into any suitable number of sections of any suitable shape or size. In some examples, the sections may be uniformly sized and distributed such as sections 1004 shown in FIG. 10, while, in other examples, a plurality of sections may be of non-uniform shapes and/or sizes as may serve a particular implementation.

After dividing depth representation 1002 into sections 1004, system 100 may analyze each section to determine a depth range by determining a lowest and a highest non-null depth value represented within the section. Based on the determined depth range (i.e., based on the lowest and highest non-null depth values), system 100 may determine a clip coordinate space for the section and a corresponding inverse view-projection transform for transforming depth values from that clip coordinate space to the world coordinate space. For example, as shown, each of the sections 1004 that include a quarter of object 204-1 (i.e., sections 1004-9, 1004-10, 1004-13, and 1004-14) is associated with a different clip coordinate space similar to coordinate space 802-A in that each is associated with the same set of depth levels 902-A. Specifically, section 1004-9 is associated with a clip coordinate space "A1," section 1004-10 is associated with a clip coordinate space "A2," section 1004-13 is associated with a clip coordinate space "A3," and section 1004-14 is associated with a clip coordinate space "A4." Similarly, each of the sections 1004 that include a half of object 204-2 (i.e., sections 1004-3 and 1004-7) is associated with a different clip coordinate space similar to coordinate space 802-B in that each is associated with the same set of depth levels 902-B. Specifically, section 1004-3 is associated with a clip coordinate space "B1" and section 1004-7 is associated with a clip coordinate space "B2." In the same way, each of the sections 1004 that include a half of object 204-3 (i.e., sections 1004-8 and 1004-12) is associated with a different clip coordinate space similar to coordinate space 802-C in that each is associated with the same set of depth levels 902-C. Specifically, section 1004-8 is associated with a clip coordinate space "C1" and section 1004-12 is associated with a clip coordinate space "C2."

Along with the sections 1004 that include at least a portion of one or more objects 204, there are also several sections 1004 that do not include any portion of an object. These sections 1004 (i.e., sections 1004-1, 1004-2, 1004-4, 1004-5, 1004-6, 1004-11, 1004-15, and 1004-16) are marked "[Empty]" and are not necessarily associated with any clip coordinate space because they include nothing but null values and there is thus no lowest or highest non-null depth value upon which to base a clip coordinate space. By identifying these sections and discarding them (i.e., ceasing to process them, transmit them, etc.), system 100 may increase its efficiency and provide additional benefits related to preserving processing and communication resources (e.g., the same or similar benefits provided by compressing depth data).

To this end, system 100 may perform any suitable operations to achieve the increased efficiency accomplished by dropping null sections of the depth representation as may serve a particular implementation. For example, system 100 may sort sections 1004 in order of density and rearrange them to separate empty and lower density sections 1004 (i.e., those with lower numbers of non-null depth values) from sections 1004 that have higher density pixels to process (i.e., more non-null depth values). Specifically, system 100 may determine a plurality of density values each representative of a ratio of non-null depth values to null depth values represented in a different section 1004 included in the plurality of sections 1004. System 100 may then alter depth representation 1002 to rearrange the plurality of sections 1004 within depth representation 1002 in order of density from a section associated with a lowest density value in the plurality of density values to a section associated with a highest density value in the plurality of density values. Once this rearranging has been performed, system 100 may discard a portion of the altered depth representation that includes one or more of the sections 1004 associated with the lowest density values (e.g., sections 1004 that are empty and do not include any non-null depth values).

To illustrate, FIG. 11 shows an altered depth representation 1102 comprising sections 1004 that have been rearranged in order of density from a lowest density section (i.e., one of the empty density sections) to a highest density section (i.e., one of the density sections covering a quarter of object 204-1). As shown in FIG. 11, the sorting and rearranging performed by system 100 to generate altered depth representation 1102 may include multiple sections having the same density value. For example, the first eight sections 1004 in the top two rows of depth representation 1102 may all have an equal density value (i.e., a value of zero). In the example of FIG. 11, various other sections may similarly have equal density values as other sections due to symmetry of objects 204 in the examples herein. For instance, all the sections 1004 on the third row may have equal density values and all the sections 1004 on the bottom row may similarly have equal density values. In some examples, just as there may be a number of sections having a density value of zero (indicating that the sections are empty), there may also be a number of sections have a density value of one (indicating that the sections are full).

After determining the density of each section 1004 (i.e., the ratio number of non-null depth values to null depth values within the section), determining the range of each section 1004 (i.e., based on the highest and lowest non-null depth values), and sorting and rearrange the sections 1004 in order of density, system 100 may discard several sections 1004 (e.g., those that are empty or have very low density). In some examples, system 100 may discard entire portions of altered depth representation 1102, such as one or more full rows of sections included within altered depth representation 1102. For instance, in the example of FIG. 11, because the top two rows of sections 1004 are completely empty, system 100 may discard the entire top half of altered depth representation 1102 (i.e., the top two rows including sections 1004-1, 1004-2, 1004-4, 1004-5, 1004-6, 1004-11, 1004-15, and 1004-16).

While altered depth representation 1102 illustrates a rearranged version of depth representation 1002, which has already been compressed, it will be understood that, in other examples, system 100 may first divide a depth representation of original data (e.g., depth representation 502 with the four-bit depth representations described in FIGS. 4 and 5) into sections, sort and rearrange the sections, discard certain sections, and then loop through each pixel of each remaining (i.e., non-discarded) section to compress the depth values. For example, only after dividing, sorting, rearranging, and discarding the sections as described above, system 100 may convert an original set of depth values represented in each section to a compressed set of depth values that is normalized based on the lowest and highest non-null depth values represented in each section (e.g., such that the compressed set of depth values is represented using fewer data bits than the original set of depth values). System 100 may loop through each pixel in each section and perform this conversion in any manner as may serve a particular implementation.

Before or after the conversion from the first (original) set of depth values to the second (compressed) set of depth values, system 100 may further determine a respective inverse view-projection transform for each different clip coordinate space (e.g., one for each of clip coordinate spaces A1 through A4, B1 through B2, and C1 through C2). This determination may be performed in any of the ways described herein. In some examples, system 100 may further perform other implementation specific operations that may facilitate the rearranging of sections 1004 or other operations described herein. For example, system 100 may include (and later remove) a one-pixel border (i.e., including null pixels without useful depth information) around the edge of each section 1004 to create an overlap and facilitate removal of spacing errors when representation 1102 is later rendered.

As described above, the methods and systems described herein help provide all the benefits of conventional data compression while preserving depth precision and/or accuracy in ways that conventional compression techniques do not offer. Additionally, along with compressing each depth value to use fewer bits (e.g., three bits per value instead of four bits in the examples illustrated herein), certain implementations of the methods and systems described herein provide further efficiency benefits by enabling sections of a depth representation to be discarded and not processed altogether.

Figure 12:
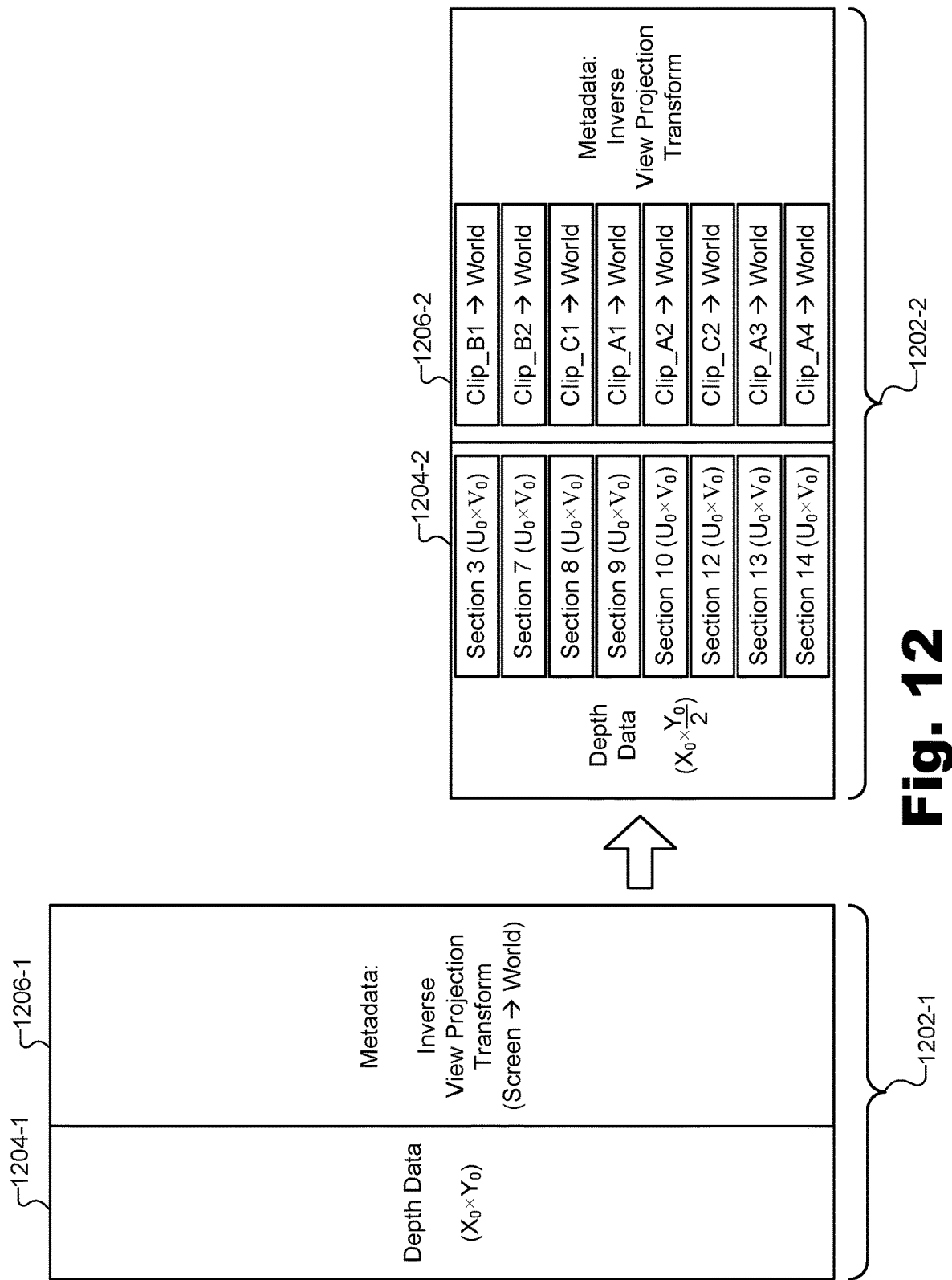
FIG. 12 illustrates exemplary depth datasets included as part of a virtual reality dataset transmitted to a media player device according to principles described herein.

To illustrate these benefits, FIG. 12 shows exemplary depth datasets included as part of a virtual reality dataset transmitted to a media player device. Specifically, a depth dataset 1202-1 including depth data 1204-1 and metadata 1206-1 is shown behind the arrow in FIG. 12 to represent a conventional depth dataset that is generated and transmitted using conventional techniques, while a depth dataset 1202-2 including depth data 1204-2 and metadata 1206-2 is shown in front of the arrow to represent the greatly reduced amount of depth data (and slightly increased amount of metadata) that is generated and transmitted using the methods and systems described herein.

Referring back to depth representation 1002 in FIG. 10, pixel dimensions are illustrated showing how many pixels are included in depth representation 1002. Specifically, as shown, the entirety of depth representation 1002 includes a number of columns $X_0$ and a number of rows $Y_0$. As further shown, each of the sixteen sections 1004 is defined by a smaller number of columns $U_0$ and a smaller number of rows $V_0$, so that $16 \times U_0 \times V_0 = X_0 \times Y_0$. While both depth data 1204-1 and 1204-2 may be compressed from four bits to three bits in the same way, FIG. 12 shows that depth data 1204-1 includes data for many more depth values ($X_0 \times Y_0$) than does depth data 1204-2 ($X_0 \times Y_0/2$). This is because half of the sections 1004 in depth representation 1002 may be discarded and not processed (compressed) or transmitted, as described above in relation to FIG. 11. Specifically, the top two rows of sections 1004 in altered depth representation 1102 may be discarded and only the bottom two rows compressed and transmitted. In this example, that means that only eight sections 1004 need be processed and transmitted, which is only half of the data processed and transmitted in the conventional case ($8 \times U_0 \times V_0 = \frac{1}{2} \times X_0 \times Y_0$)

The tradeoff for these significant savings in the amount of data to process and transmit, as well as the improved depth precision and accuracy described above, is merely that more metadata may be transmitted as part of depth dataset 1202-2 to enable all the depth data to be properly put back together (i.e., transformed by to world coordinate space 206) after being received by a media player device. Specifically, as shown in FIG. 12, a single inverse view-projection transform from screen coordinate space 304 to world coordinate space 206 (e.g., inverse view-projection transform 312) may serve for all of depth data 1204-1. In contrast, an individual inverse view-projection transform from each clip coordinate space to world coordinate space 206 may be included within metadata 1206-2 to serve each of the different sections of depth data included in depth data 1204-2. Accordingly, approximately eight times as much metadata may be transmitted in this example. It will be understood, however, that the amount of data included in each inverse view-projection transform is a relatively small amount of data (e.g., a few bytes representative of numbers in a 4×4 matrix transform) while the amount of depth data saved may be much more significant (e.g., thousands or millions of bytes of pixel data), resulting in a significant net efficiency gain when depth dataset 1202-2 is generated and transmitted rather than depth dataset 1202-1.

Methods and systems described herein for preserving precision in compressed depth data representative of a scene may be implemented and employed within or together with any other systems as may serve a particular implementation. For example, as mentioned above, system 100 may be included as part of a server-side virtual reality provider system that performs any or all of the functionality of system 100 described herein while further performing various additional functionality to generate and provide virtual reality data to media player devices used by users. In some examples, for instance, a virtual reality provider system may generate depth representations processed in the ways described herein as frames in a depth video sequence, and may further generate corresponding color data images along with the depth representations. Moreover, various different color data images and/or depth data representations may be combined together onto one or more atlas frame sequences. For example, different color and depth data representations of a virtual reality scene captured or rendered from different vantage points around the virtual reality scene may be all be packed together into a sequence of atlas sheets (referred to herein as "atlas frame sequences") that may be processed frame by frame using any of the techniques described herein.

As one specific example, an exemplary virtual reality provider system may generate, based on a virtual reality scene associated with a world coordinate space, a color data atlas frame sequence and a depth data atlas frame sequence. The depth data atlas frame sequence may be associated with a screen coordinate space and may comprise a particular depth data atlas frame that will be referred to specifically below, though it will be understood that the following operations may be performed with respect to each depth data atlas frame in the sequence and not only the particular depth data atlas frame.

The depth data atlas frame may include a plurality of views of the virtual reality scene. For instance, each view may comprise a depth representation such as one of the depth representations described above (e.g., original depth representation 502) from a particular vantage point into the virtual reality scene (e.g., vantage point 210 into virtual reality scene 202). The virtual reality provider system may divide the depth data atlas frame into a plurality of sections associated with a plurality of different clip coordinate spaces. Specifically, the depth data atlas frame may be divided in such a way that the plurality of sections each correspond to no more than one view in the plurality of views (i.e., such that each section corresponds to a portion of only one view, rather than comprising portions of different views). The plurality of sections may include a particular section associated with a particular clip coordinate space. Again, while the operations described below will be described in relation to the particular section, it will be understood that similar operations may be performed upon each section in each plurality of sections.

As described above in relation to system 100, the exemplary virtual reality provider system may determine a lowest non-null depth value and a highest non-null depth value represented in the particular section, and, based on the lowest and highest non-null depth values, may determine an inverse view-projection transform for transforming depth values from the particular clip coordinate space to the world coordinate space. The virtual reality provider system may also convert an original set of depth values represented in the particular section to a compressed set of depth values normalized based on the lowest and highest non-null depth values represented in the particular section in any of the ways described herein. For example, the depth values in the compressed set of depth values may be converted to be represented using fewer data bits (e.g., three data bits) than the depth values in the original set of depth values (e.g., which may have been represented using four data bits in the examples illustrated herein). The virtual reality provider system may further provide, to a media player device by way of a network, a virtual reality dataset representative of the virtual reality scene. The virtual reality dataset may include data representative of the color data atlas frame sequence, which may have undergone other processing within the virtual reality provider system that is outside the scope of this disclosure. The virtual reality dataset may further include a compressed version of the depth data atlas frame sequence processed to preserve data precision by including the compressed set of depth values and the inverse view-projection transform (as well as similar depth values and transforms for each section of each view of each atlas frame in the atlas frame sequence).

Figure 13:
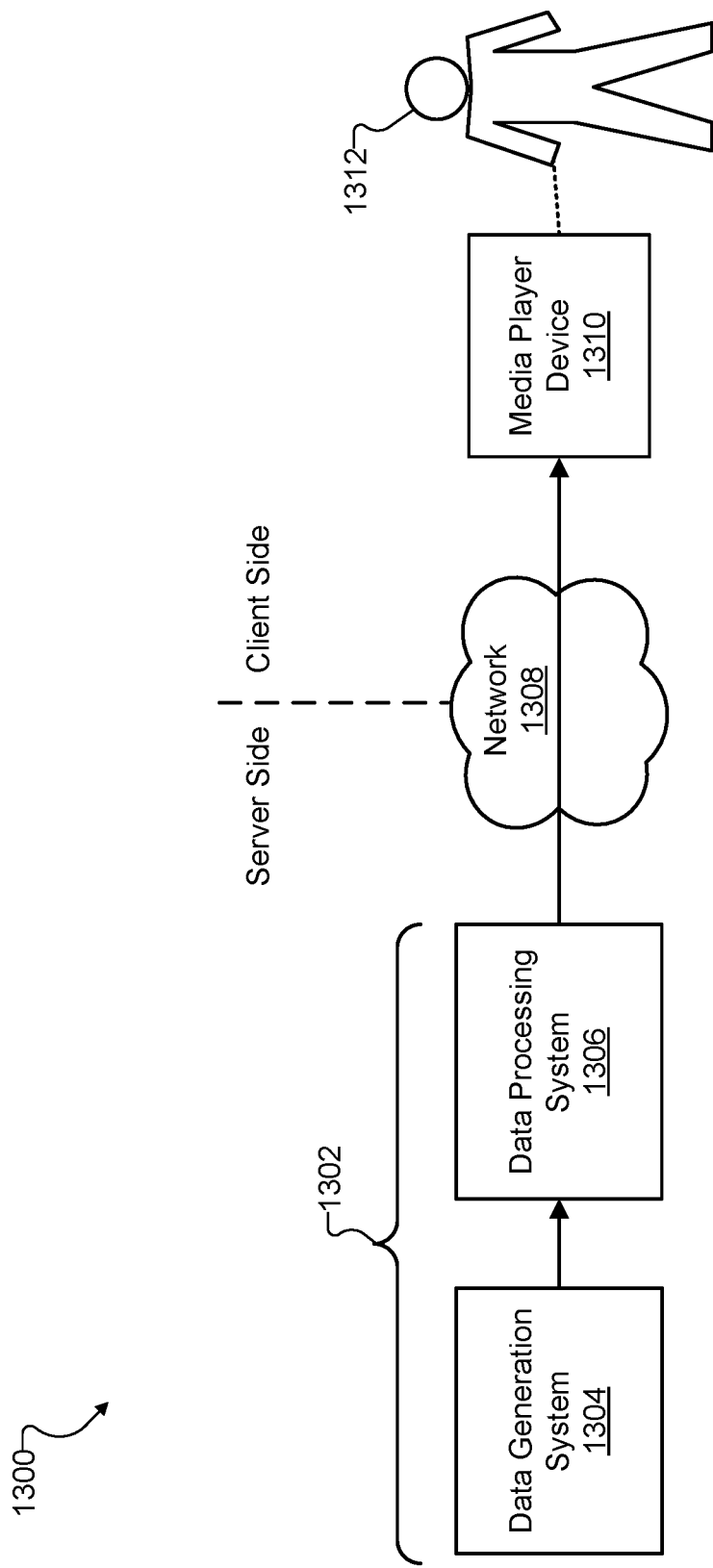
FIG. 13 illustrates an exemplary configuration including an exemplary virtual reality provider system implementing the data precision preservation system of FIG. 1 according to principles described herein.

To illustrate such a virtual reality provider system and a configuration in which it operates, FIG. 13 shows an exemplary configuration 1300 including a virtual reality provider system 1302 that implements system 100 for preserving precision in compressed depth data representative of a scene such as a virtual reality scene. As shown, virtual reality provider system 1302 includes a data generation system 1304 and a data processing system 1306 connected, by way of a network 1308, to a media player device 1310 used by a user 1312.

As illustrated in FIG. 13, a server-client approach may be employed in configuration 1300 for virtual reality data to be generated by and provided from a server side of network 1308, and to be received by and consumed on a client side of network 1308. On the server side, configuration 1300 may employ a pipeline approach for generating data. Specifically, data generation system 1304 may capture or generate (e.g., render) raw video data (e.g., color data and depth data) representative of any type of virtual reality scene described herein. This data may then be passed through the pipeline to be processed by data processing system 1306, in which system 100 may be implemented and various other operations may be performed with respect to the color and/or the depth data. In some examples, additional or fewer components may be included in the pipeline than illustrated in configuration 1300 and explicitly described herein.

It will be understood that each of the components of the pipeline illustrated in configuration 200 may be implemented using computer hardware and software in any suitable manner. For instance, data generation system 1304 and data processing system 1306 illustrated in configuration 1300 may represent a different computing device or group of devices (e.g., a different server computer or group of servers), or these may be merged and combined in any manner as may serve a particular implementation.

Data generation system 1304 may be configured to capture or generate color and/or depth data representative of a scene such as a virtual reality scene in any manner as may serve a particular implementation. For instance, the virtual reality scene may be based on a real-world scene and the color images and depth representations of the virtual reality scene may be generated to include captured depth data representative of the real-world scene. In other examples, the virtual reality scene may be based on a virtualized scene and the color images and depth representations of the virtual reality scene may be generated to include rendered depth data representative of the virtualized scene. To this end, data generation system 1304 may include any image or depth capture devices (e.g., video cameras, depth imaging devices, etc.) configured to capture images for processing and distribution, three-dimensional rendering engines configured to render color and depth data representative of a virtual scene from different virtual vantage points around the virtual scene, or any other systems or devices as may serve a particular implementation.

Data processing system 1306 may implement a data precision preservation system (e.g., system 100) performing any of the operations described herein for preserving precision in compressed depth data representative of a scene. Additionally, data processing system 1306 may process color data alongside the depth data to generate a virtual reality dataset to be provided to media player device 1310 for rendering and presentation to user 1312. As mentioned above, in some examples, it may be convenient for data processing system 1306 to receive, generate, process, transmit, and/or otherwise work with color and depth data that is combined onto color atlas frame sequences, depth atlas frame sequences, or combined color and depth atlas frame sequences.

To illustrate, FIG. 14A shows an exemplary atlas frame 1402 that includes a plurality of views 1404 (e.g., view 1404-1 through 1404-16). Atlas frame 1402 may represent a color atlas frame in which each of views 1404 are a color data image of a virtual reality scene (e.g., a color data image captured or rendered from a different vantage point). Atlas frame 1402 may also depict a depth atlas frame in which each of views 1404 are a depth representation of a virtual reality scene (e.g., a depth representation captured or rendered from a different vantage point). In some examples, both color images and depth representations may be included in different views 1404 in atlas frame 1402.

Atlas frame 1402 depicts a single frame that may be included within a sequence of such frames. For example, each view 1404 may combine with corresponding views in other atlas frames in an atlas frame sequence to form a video image or video depth representation depicting the virtual reality scene from a particular vantage point over a period of time.

In some examples, the depth representations described herein as being processed by system 100 may be implemented by a single view included in a plurality of views of the virtual reality scene that are included on an atlas frame such as atlas frame 1402. As such, system 100 (e.g., data processing system 1306) may access the depth representation as part of accessing the atlas frame, and may divide the depth representation into the plurality of sections as part of dividing the atlas frame into respective pluralities of sections for the views in the plurality of views.

To illustrate, for example, FIG. 14B shows atlas frame 1402 after each of views 1404 has been divided into a plurality of sixteen sections 1406. For example, a particular view 1404 may implement a depth representation such as depth representation 1002 (described above in relation to FIG. 10) and the sixteen sections 1406 included therein may implement sections 1004-1 through 1004-16. As shown, each section 1406 within each plurality of sections (i.e., within each view 1404) associated with the plurality of views 1404 corresponds to no more than one view 1404 in the plurality of views included on atlas frame 1402. In other words, system 100 may divide atlas frame 1402 into sections 1406 in such a way that no section 1406 contains a part of more than one view 1404, but, rather, is confined to represent a portion of only one view 1404, as shown.

It will be understood that, in examples in which atlas frames are employed and sections are sorted, rearranged, and discarded in the ways described above, that each view may not be treated separately (as described above in relation to depth representations 1002 and 1102), but, rather, that all of sections 1406 from all of views 1404 may be processed (e.g., sorted, rearranged, etc.) collectively. As long as each section 1406 only corresponds to a portion of a single view 1404 and is assigned its own metadata (e.g., its own inverse view-projection transform corresponding to its own clip coordinate space, etc.), there may be no need after transmission to media player device 1310 to identify which section 1406 corresponds to which view 1404, to rearrange sections 1406 back into the original views 1404 of which they were a part, or the like.

Returning to FIG. 13, data processing system 1306 may perform the operations described herein with respect to depth data, as well as any processing of color data, as may serve a particular implementation. Data processing system 1306 may then generate one or more virtual reality datasets that virtual reality provider system 1302 may provide to media player device 1310 by way of network 1308. These virtual reality datasets may include all the data needed for media player device 1310 to render virtual reality media content for presentation to user 1312 to allow user 1312 to experience a virtual reality scene. For example, as described above, the virtual reality data generated and sent may include processed and compressed color data, processed and compressed depth data, and so forth.

Network 1308 may facilitate data delivery between server-side systems such as virtual reality provider system 1302 and client-side systems such as media player device 1310 in the server-client data delivery architecture illustrated by configuration 1300. As such, network 1308 may include a wireless local area network (e.g., a Wi-Fi network), a provider-specific wired or wireless network (e.g., a cable or satellite carrier network, a mobile telephone network, etc.), the Internet, a wide area network, a content delivery network, and/or any other suitable network or networks, and data may be distributed using any suitable communication technologies included within network 1308. As such, data may flow between virtual reality provider system 1302 and media player device 1310 (as well as various other media player devices 1310 not explicitly shown) using any communication technologies, devices, media, and protocols as may serve a particular implementation.

Media player device 1310 may be used by user 1312 to access and experience virtual reality data generated and provided by virtual reality provider system 1302. For example, media player device 1310 may be configured to generate (e.g., based on color and depth frame sequences included within a virtual reality dataset transmitted by virtual reality provider system 1302) a 3D representation of a virtual reality scene to be experienced by user 1312 from an arbitrary experience location (e.g., a dynamically selectable location selected by the user and corresponding to an arbitrary virtual location within the virtual reality scene). To this end, media player device 1310 may be implemented by any device capable of presenting a field of view of a virtual reality scene and detecting user input from user 1312 to dynamically update the content of the virtual reality scene presented within the field of view as user 1312 experiences the virtual reality scene. For example, an exemplary media player device 1310 may be implemented as a head-mounted virtual reality device (e.g., a virtual reality gaming device) that includes a head-mounted display screen. In other examples, other form factors such as a personal computer device (e.g., a desktop computer, laptop computer, etc.), a mobile or wireless device (e.g., a smartphone, a tablet device, etc., possibly mounted to the head of user 1312 by means of a head mount apparatus), or another suitable device or configuration of devices may be used.

Figure 15:
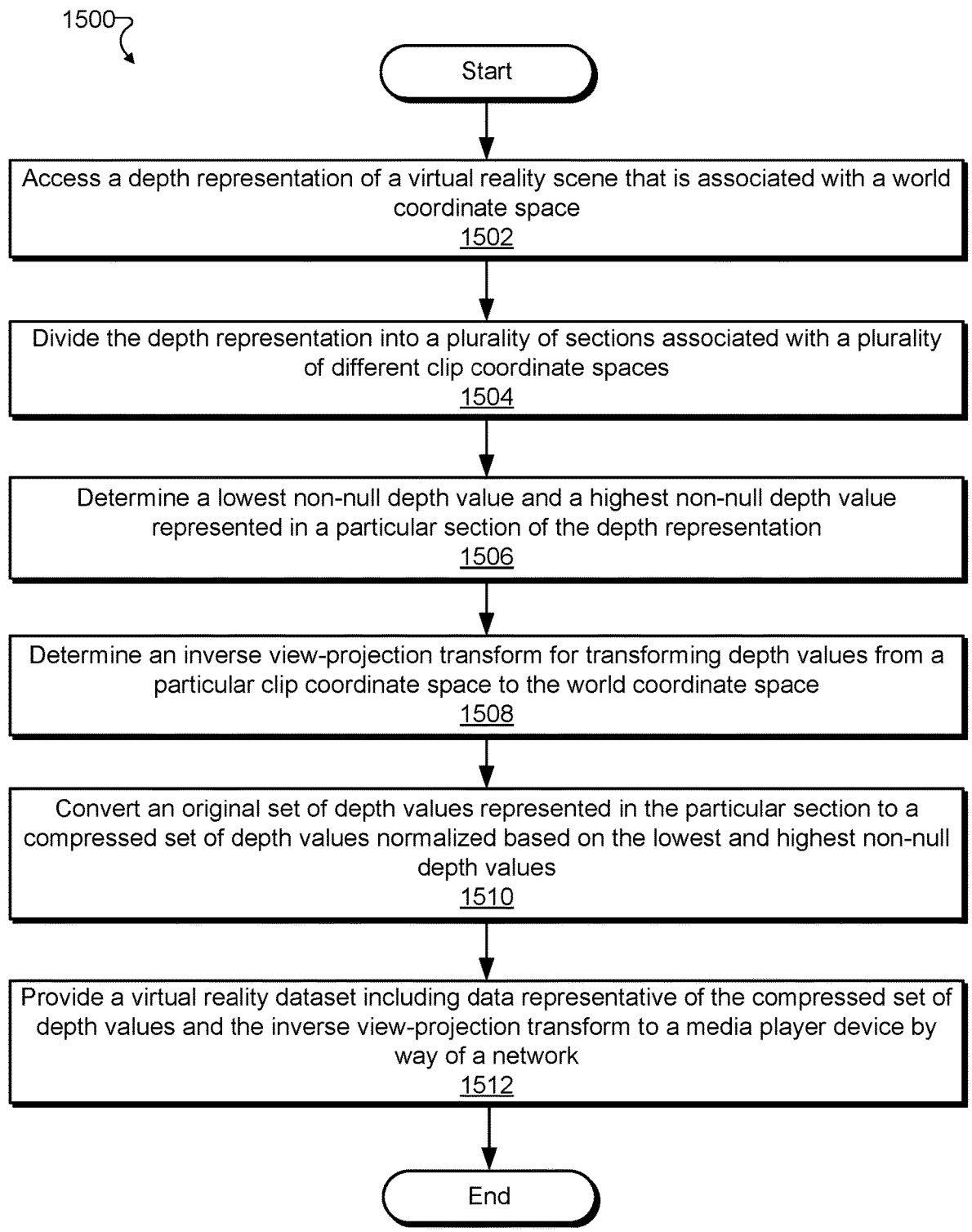
FIGS. 15 and 16 illustrate exemplary methods for preserving precision in compressed depth data representative of a scene according to principles described herein.

FIG. 15 illustrates an exemplary method 1500 for preserving precision in compressed depth data representative of a scene. While FIG. 15 illustrates exemplary operations according to one embodiment, other embodiments may omit, add to, reorder, and/or modify any of the operations shown in FIG. 15. One or more of the operations shown in FIG. 15 may be performed by system 100, any components included therein, and/or any implementation thereof.

In operation 1502, a data precision preservation system may access a depth representation of a virtual reality scene. In some examples, the virtual reality scene may be associated with a world coordinate space and the depth representation may be associated with a screen coordinate space. Operation 1502 may be performed in any of the ways described herein.

In operation 1504, the data precision preservation system may divide the depth representation accessed in operation 1502 into a plurality of sections associated with a plurality of different clip coordinate spaces. The plurality of sections may include a particular section associated with a particular clip coordinate space. Operation 1504 may be performed in any of the ways described herein.

In operation 1506, the data precision preservation system may determine a lowest non-null depth value and a highest non-null depth value represented in the particular section of the depth representation. Operation 1506 may be performed in any of the ways described herein.

In operation 1508, the data precision preservation system may determine an inverse view-projection transform for transforming depth values from the particular clip coordinate space to the world coordinate space. For example, the data precision preservation system may determine the inverse view-projection transform based on the lowest and highest non-null depth values determined in operation 1506. Operation 1508 may be performed in any of the ways described herein.

In operation 1510, the data precision preservation system may convert an original set of depth values represented in the particular section of the depth representation to a compressed set of depth values. For example, the converted compressed set of depth values may be normalized based on the lowest and highest non-null depth values represented in the particular section as determined in operation 1506. In some implementations, the depth values in the compressed set of depth values are represented using fewer data bits than the depth values in the original set of depth values. Operation 1510 may be performed in any of the ways described herein.

In operation 1512, the data precision preservation system may provide a virtual reality dataset representative of the virtual reality scene to a media player device by way of a network. In some examples, the virtual reality dataset may include data representative of the compressed set of depth values and the inverse view-projection transform. Operation 1512 may be performed in any of the ways described herein.

Figure 16:
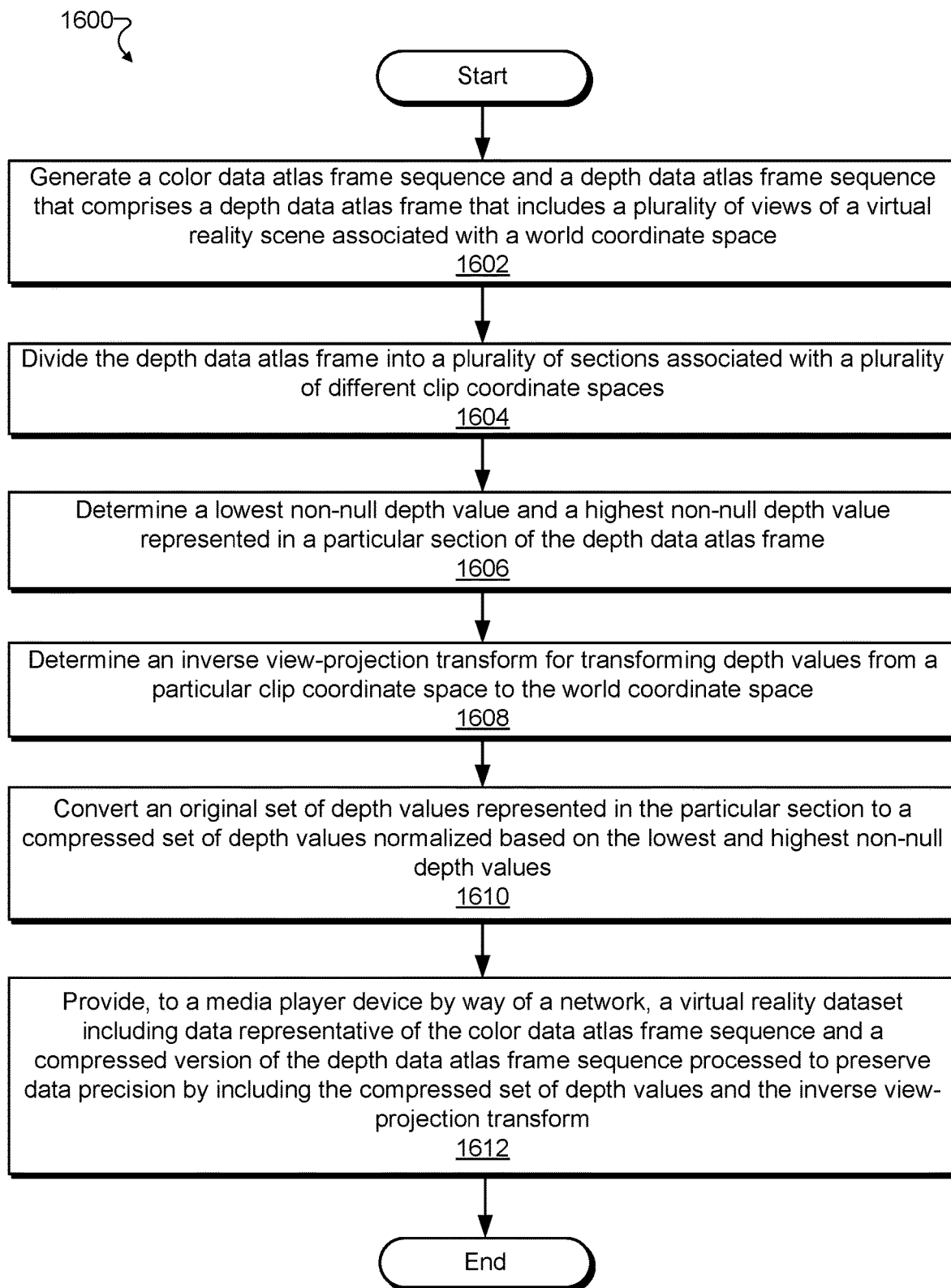

FIG. 16 illustrates an exemplary method 1600 for preserving precision in compressed depth data representative of a scene. While FIG. 16 illustrates exemplary operations according to one embodiment, other embodiments may omit, add to, reorder, and/or modify any of the operations shown in FIG. 16. One or more of the operations shown in FIG. 16 may be performed by a virtual reality provider system implementing system 100, any components included therein, and/or any implementation thereof. For example, virtual reality provider system 1302 may perform any or all of the operations included in method 1600.

In operation 1602, a virtual reality provider system implementing a data precision preservation system may generate a color data atlas frame sequence and a depth data atlas frame sequence. For example, the virtual reality provider system may generate the atlas frame sequences based on a virtual reality scene associated with a world coordinate space. In some implementations, the depth data atlas frame sequence may be associated with a screen coordinate space and may comprise a depth data atlas frame that includes a plurality of views of the virtual reality scene. Operation 1602 may be performed in any of the ways described herein.

In operation 1604, the virtual reality provider system may divide the depth data atlas frame comprised within the depth data atlas frame sequence generated in operation 1602 into a plurality of sections associated with a plurality of different clip coordinate spaces. In some examples, the plurality of sections may each correspond to no more than one view in the plurality of views, and the plurality of sections may include a particular section associated with a particular clip coordinate space. Operation 1604 may be performed in any of the ways described herein.

In operation 1606, the virtual reality provider system may determine a lowest non-null depth value and a highest non-null depth value represented in the particular section. Operation 1606 may be performed in any of the ways described herein.

In operation 1608, the virtual reality provider system may determine an inverse view-projection transform for transforming depth values from the particular clip coordinate space to the world coordinate space. For instance, the virtual reality provider system may determine the inverse view-projection transform based on the lowest and highest non-null depth values determined in operation 1606. Operation 1608 may be performed in any of the ways described herein.

In operation 1610, the virtual reality provider system may convert an original set of depth values represented in the particular section to a compressed set of depth values. The compressed set of depth values may be normalized based on the lowest and highest non-null depth values represented in the particular section. Additionally, the depth values in the compressed set of depth values may be represented using fewer data bits than the depth values in the original set of depth values. Operation 1610 may be performed in any of the ways described herein.

In operation 1612, the virtual reality provider system may provide a virtual reality dataset representative of the virtual reality scene to a media player device by way of a network. The virtual reality dataset may include data representative of the color data atlas frame sequence generated in operation 1602. Additionally, the virtual reality dataset may include data representative of a compressed version of the depth data atlas frame sequence that is processed to preserve data precision by including the compressed set of depth values and the inverse view-projection transform. Operation 1612 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor- readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 17:
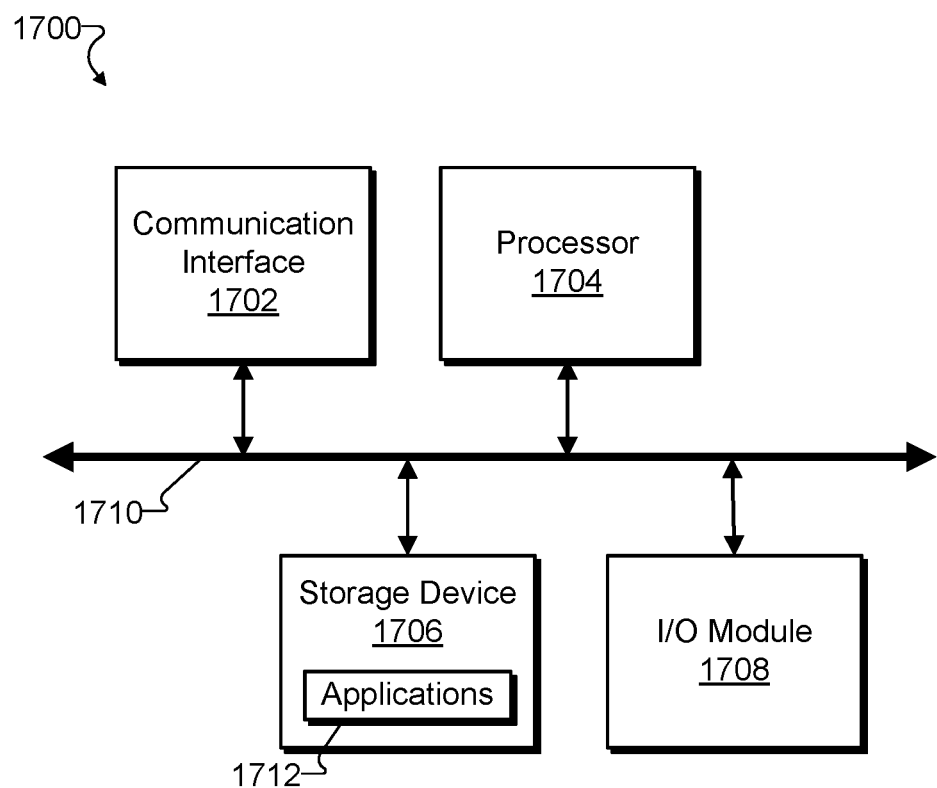
FIG. 17 illustrates an exemplary computing device according to principles described herein.

FIG. 17 illustrates an exemplary computing device 1700 that may be specifically configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit (e.g., a central processing unit and/or a graphics processing unit) capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1706. For example, data representative of one or more executable applications 1712 configured to direct processor 1704 to perform any of the operations described herein may be stored within storage device 1706. In some examples, data may be arranged in one or more databases residing within storage device 1706.

I/O module 1708 may include one or more I/O modules configured to receive user input and provide user output. One or more I/O modules may be used to receive input for a single virtual reality experience. I/O module 1708 may include any hardware, firmware, software, or combination thereof supportive of input and output capabilities. For example, I/O module 1708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1700. For example, one or more applications 1712 residing within storage device 1706 may be configured to direct processor 1704 to perform one or more operations or functions associated with facilities 102 or 104 of system 100 (see FIG. 1). Likewise, storage facility 106 may be implemented by or within storage device 1706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
dividing, by a data precision preservation system, a depth representation into a first section and a second section separate from the first section;
determining, by the data precision preservation system, data bits representing numbers that correspond to a lowest non-null depth value and a highest non-null depth value represented in the first section;

converting, by the data precision preservation system, an original set of depth values represented in the first section to a compressed set of depth values normalized based on the lowest and highest non-null depth values represented in the first section; and generating, by the data precision preservation system, a dataset that includes data representative of the compressed set of depth values and an inverse view-projection transform that is based on the lowest and highest non-null depth values represented in the first section and is configured to facilitate conversion of the compressed set of depth values back to the original set of depth values.

2. The method of claim 1, further comprising determining, by the data precision preservation system based on the lowest and highest non-null depth values represented in the first section, the inverse view-projection transform;
wherein:
the original set of depth values represented in the first section are associated with a world coordinate space,
the compressed set of depth values are converted to become associated with a first clip coordinate space, and
the inverse view-projection transform is configured to facilitate conversion of the compressed set of depth values back to the original set of depth values by transforming depth values from the first clip coordinate space to the world coordinate space.

3. The method of claim 2, wherein the determining of the inverse view-projection transform includes:
determining a view transform for transforming depth values from the world coordinate space to a camera coordinate space;
determining a projection transform for transforming depth values from the camera coordinate space to a screen coordinate space associated with the depth representation;
combining the view transform and the projection transform to generate a view-projection transform for transforming depth values from the world coordinate space to the screen coordinate space;
identifying a relationship between the screen coordinate space and the first clip coordinate space; and
generating the inverse view-projection transform based on the view-projection transform and the identified relationship between the screen coordinate space and the first clip coordinate space.

4. The method of claim 1, further comprising:
determining, by the data precision preservation system, data bits representing additional numbers that correspond to a lowest non-null depth value and a highest non-null depth value represented in the second section, the additional numbers different from the numbers; and
converting, by the data precision preservation system, a second original set of depth values represented in the second section to a second compressed set of depth values normalized based on the lowest and highest non-null depth values represented in the second section;
wherein:
the dataset is generated to further include data representative of the second compressed set of depth values and a second inverse view-projection transform different from the inverse view-projection transform, and
the second inverse view-projection transform is based on the lowest and highest non-null depth values represented in the second section and is configured to facilitate conversion of the second compressed set of depth values back to the second original set of depth values.

5. The method of claim 4, further comprising:
determining, by the data precision preservation system based on the lowest and highest non-null depth values represented in the first section, the inverse view-projection transform; and
determining, by the data precision preservation system based on the lowest and highest non-null depth values represented in the second section, the second inverse view-projection transform;
wherein:
the original set of depth values represented in the first section and the second original set of depth values represented in the second section are associated with a world coordinate space,
the compressed set of depth values are converted to become associated with a first clip coordinate space,
the second compressed set of depth values are converted to become associated with a second clip coordinate space different from the first clip coordinate space,
the inverse view-projection transform is configured to facilitate conversion of the compressed set of depth values back to the original set of depth values by transforming depth values from the first clip coordinate space to the world coordinate space, and
the second inverse view-projection transform is configured to facilitate conversion of the second compressed set of depth values back to the second original set of depth values by transforming depth values from the second clip coordinate space to the world coordinate space.

6. The method of claim 1, further comprising:
determining, by the data precision preservation system, a respective density value corresponding to each of the first section, the second section, and any additional sections into which the depth representation is divided, wherein each respective density value is representative of a ratio of non-null depth values to null depth values represented in the respective section to which the density value corresponds;
altering, by the data precision preservation system based on the respective density values, the depth representation to rearrange the first section, the second section, and any additional sections in order of density from a section corresponding to a lowest density value to a section having a highest density value; and
discarding, by the data precision preservation system, a portion of the altered depth representation that includes the section having the lowest density value.

7. The method of claim 1, wherein the depth representation implements a single view included with other views of a plurality of views combined on an atlas frame.

8. The method of claim 1, further comprising providing, by the data precision preservation system to a media player device by way of a network, the dataset that includes the data representative of the compressed set of depth values and the inverse view-projection transform.

9. The method of claim 8, wherein:
the depth representation corresponds to a virtual reality scene; and
the provided dataset is a virtual reality dataset requested by the media player device by way of the network.

10. A system comprising:
a memory storing instructions; and
a processor communicatively coupled to the memory and configured to execute the instructions to:
  divide a depth representation into a first section and a second section separate from the first section;
  determine data bits representing numbers that correspond to a lowest non-null depth value and a highest non-null depth value represented in the first section;
  convert an original set of depth values represented in the first section to a compressed set of depth values normalized based on the lowest and highest non-null depth values represented in the first section; and
  generate a dataset that includes data representative of the compressed set of depth values and an inverse view-projection transform that is based on the lowest and highest non-null depth values represented in the first section and is configured to facilitate conversion of the compressed set of depth values back to the original set of depth values.

11. The system of claim 10, wherein:
the processor is further configured to execute the instructions to determine, based on the lowest and highest non-null depth values represented in the first section, the inverse view-projection transform;
the original set of depth values represented in the first section are associated with a world coordinate space;
the compressed set of depth values are converted to become associated with a first clip coordinate space; and
the inverse view-projection transform is configured to facilitate conversion of the compressed set of depth values back to the original set of depth values by transforming depth values from the first clip coordinate space to the world coordinate space.

12. The system of claim 11, wherein the determining of the inverse view-projection transform includes:
determining a view transform for transforming depth values from the world coordinate space to a camera coordinate space;
determining a projection transform for transforming depth values from the camera coordinate space to a screen coordinate space associated with the depth representation;
combining the view transform and the projection transform to generate a view-projection transform for transforming depth values from the world coordinate space to the screen coordinate space;
identifying a relationship between the screen coordinate space and the first clip coordinate space; and
generating the inverse view-projection transform based on the view- projection transform and the identified relationship between the screen coordinate space and the first clip coordinate space.

13. The system of claim 10, wherein:
the processor is further configured to execute the instructions to:
  determine data bits representing additional numbers that correspond to a lowest non-null depth value and a highest non-null depth value represented in the second section, the additional numbers different from the numbers, and
  convert a second original set of depth values represented in the second section to a second compressed set of depth values normalized based on the lowest and highest non-null depth values represented in the second section;
the dataset is generated to further include data representative of the second compressed set of depth values and a second inverse view-projection transform different from the inverse view-projection transform; and
the second inverse view-projection transform is based on the lowest and highest non-null depth values represented in the second section and is configured to facilitate conversion of the second compressed set of depth values back to the second original set of depth values.

14. The system of claim 13, wherein:
the processor is further configured to execute the instructions to:
  determine, based on the lowest and highest non-null depth values represented in the first section, the inverse view-projection transform, and
  determine, based on the lowest and highest non-null depth values represented in the second section, the second inverse view-projection transform;
the original set of depth values represented in the first section and the second original set of depth values represented in the second section are associated with a world coordinate space;
the compressed set of depth values are converted to become associated with a first clip coordinate space;
the second compressed set of depth values are converted to become associated with a second clip coordinate space different from the first clip coordinate space;
the inverse view-projection transform is configured to facilitate conversion of the compressed set of depth values back to the original set of depth values by transforming depth values from the first clip coordinate space to the world coordinate space; and
the second inverse view-projection transform is configured to facilitate conversion of the second compressed set of depth values back to the second original set of depth values by transforming depth values from the second clip coordinate space to the world coordinate space.

15. The system of claim 10, wherein the processor is further configured to execute the instructions to:
determine a respective density value corresponding to each of the first section, the second section, and any additional sections into which the depth representation is divided, wherein each respective density value is representative of a ratio of non-null depth values to null depth values represented in the respective section to which the density value corresponds;
alter, based on the respective density values, the depth representation to rearrange the first section, the second section, and any additional sections in order of density from a section corresponding to a lowest density value to a section having a highest density value; and
discard a portion of the altered depth representation that includes the section having the lowest density value.

16. The system of claim 10, wherein the depth representation implements a single view included with other views of a plurality of views combined on an atlas frame.

17. The system of claim 10, wherein the processor is further configured to execute the instructions to provide, to a media player device by way of a network, the dataset that includes the data representative of the compressed set of depth values and the inverse view-projection transform.

18. The system of claim 17, wherein:
the depth representation corresponds to a virtual reality scene; and the provided dataset is a virtual reality dataset requested by the media player device by way of the network.

19. A non-transitory computer-readable medium storing instructions that, when executed, direct a processor of a computing device to:

divide a depth representation into a first section and a second section separate from the first section;

determine data bits representing numbers that correspond to a lowest non-null depth value and a highest non-null depth value represented in the first section;

convert an original set of depth values represented in the first section to a compressed set of depth values normalized based on the lowest and highest non-null depth values represented in the first section; and generate a dataset that includes data representative of the compressed set of depth values and an inverse view-projection transform that is based on the lowest and highest non-null depth values represented in the first section and is configured to facilitate conversion of the compressed set of depth values back to the original set of depth values.

20. The non-transitory computer-readable medium of claim 19, wherein:

the instructions further direct the processor determine, based on the lowest and highest non-null depth values represented in the first section, the inverse view-projection transform;

the original set of depth values represented in the first section are associated with a world coordinate space;

the compressed set of depth values are converted to become associated with a first clip coordinate space; and the inverse view-projection transform is configured to facilitate conversion of the compressed set of depth values back to the original set of depth values by transforming depth values from the first clip coordinate space to the world coordinate space.

* * * * *